(12) United States Patent
Fitzpatrick et al.

(10) Patent No.: US 12,443,497 B2
(45) Date of Patent: Oct. 14, 2025

(54) HIGH AVAILABILITY SYSTEMS HAVING THINLY-PROVISIONED SECONDARY SERVERS

(71) Applicant: Hewlett Packard Enterprise Development LP, Spring, TX (US)

(72) Inventors: Eric P. Fitzpatrick, Durham, NC (US); Isaac R. Nassi, Los Gatos, CA (US); David P. Reed, Los Gatos, CO (US); Gary Smerdon, Monterey, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/336,131

(22) PCT Filed: Feb. 28, 2023

(86) PCT No.: PCT/US2023/014029
§ 371 (c)(1),
(2) Date: Jun. 16, 2023

(87) PCT Pub. No.: WO2024/005875
PCT Pub. Date: Jan. 4, 2024

(65) Prior Publication Data
US 2025/0117300 A1  Apr. 10, 2025

Related U.S. Application Data

(60) Provisional application No. 63/356,865, filed on Jun. 29, 2022.

(51) Int. Cl.
 *G06F 11/20* (2006.01)
(52) U.S. Cl.
 CPC ...... *G06F 11/2033* (2013.01); *G06F 11/2025* (2013.01); *G06F 11/2041* (2013.01)

(58) Field of Classification Search
CPC ............ G06F 11/2033; G06F 11/2025; G06F 11/2041
See application file for complete search history.

(56) References Cited

U.S. PATENT DOCUMENTS 9,848,041 B2 * 12/2017 Einkauf ................. H04L 67/10
10,061,652 B2 * 8/2018 Johnson ................ G06F 11/142
(Continued)

FOREIGN PATENT DOCUMENTS

WO   WO-2023229691 A1 * 11/2023 ............ G06F 11/008

OTHER PUBLICATIONS

International Search Report and Written Opinion received for PCT Patent Application No. PCTUS/2023/014029, mailed on Jun. 13, 2023, 9 pages.

*Primary Examiner* — Matthew M Kim
*Assistant Examiner* — Indranil Chowdhury
(74) *Attorney, Agent, or Firm* — Trop, Pruner & Hu, P.C.

(57) ABSTRACT

In accordance with example implementations, a process includes associating a secondary computer system with a primary computer system. The secondary computer system includes a first virtual machine, which is hosted by a secondary set of physical computer nodes. The primary computer system has a primary role, and the primary role corresponds to a minimum physical resource allocation. The secondary computer system is associated with a secondary role, and the second computer system is provisioned with a second physical resource allocation, which is less than the minimum physical resource allocation. The process includes, responsive to the primary computer system failing and without rebooting the secondary computer system, preparing the secondary computer system to take over the primary role. The preparation includes adding at least one physical computer node to the secondary set of physical computer nodes to cause the second physical resource (Continued)

allocation to meet or exceed the minimum physical resource allocation. The process includes, responsive to the primary computer system failing and without rebooting the secondary computer system, causing the secondary computer system to take over the primary role.

20 Claims, 7 Drawing Sheets

(56) References Cited

U.S. PATENT DOCUMENTS

| | | | | |
|---|---|---|---|---|
| 10,846,079 | B2* | 11/2020 | Olderdissen | G06F 11/203 |
| 2005/0273645 | A1* | 12/2005 | Satran | G06F 11/2028 |
| | | | | 714/4.1 |
| 2013/0036322 | A1 | 2/2013 | Bauer et al. | |
| 2014/0189085 | A1* | 7/2014 | Khandelwal | H04L 41/5096 |
| | | | | 709/223 |
| 2014/0280951 | A1* | 9/2014 | Steinder | H04L 47/70 |
| | | | | 709/226 |
| 2015/0324260 | A1 | 11/2015 | Mutalik et al. | |
| 2016/0072725 | A1* | 3/2016 | Amann | G06F 9/5022 |
| | | | | 709/226 |
| 2017/0168907 | A1* | 6/2017 | Harper | G06F 11/2025 |
| 2017/0264564 | A1* | 9/2017 | Suchter | H04L 47/83 |
| 2018/0048522 | A1* | 2/2018 | Pan | G06F 11/3006 |
| 2018/0095845 | A1* | 4/2018 | Sanakkayala | G06F 9/45558 |
| 2018/0302340 | A1* | 10/2018 | Alvarez Callau | H04L 47/76 |
| 2019/0149399 | A1* | 5/2019 | Reed | H04L 41/0895 |
| | | | | 709/223 |
| 2019/0340088 | A1* | 11/2019 | Sanakkayala | G06F 11/1438 |
| 2019/0384667 | A1* | 12/2019 | Aiyar | G06F 9/45558 |
| 2019/0384668 | A1* | 12/2019 | Aiyar | G06F 11/0709 |
| 2021/0232469 | A1* | 7/2021 | Gill | G06F 11/2025 |
| 2025/0045166 | A1* | 2/2025 | Mal | G06F 11/1448 |

* cited by examiner

HIGH AVAILABILITY SYSTEMS HAVING THINLY-PROVISIONED SECONDARY SERVERS

CROSS REFERENCE TO RELATED APPLICATIONS

This application claims the benefit under 35 U.S.C. § 119(e) of U.S. Provisional Application No. 63/356,865, entitled, "High Availability and Disaster Recovery," which was filed on Jun. 29, 2022, and which is hereby incorporated by reference in its entirety.

BACKGROUND

A distributed system includes multiple computer nodes that can run in parallel to provide increased processing throughput, as compared to single-node systems. The computer nodes can execute respective programs that are to perform corresponding operations.

DETAILED DESCRIPTION

Figure 1:
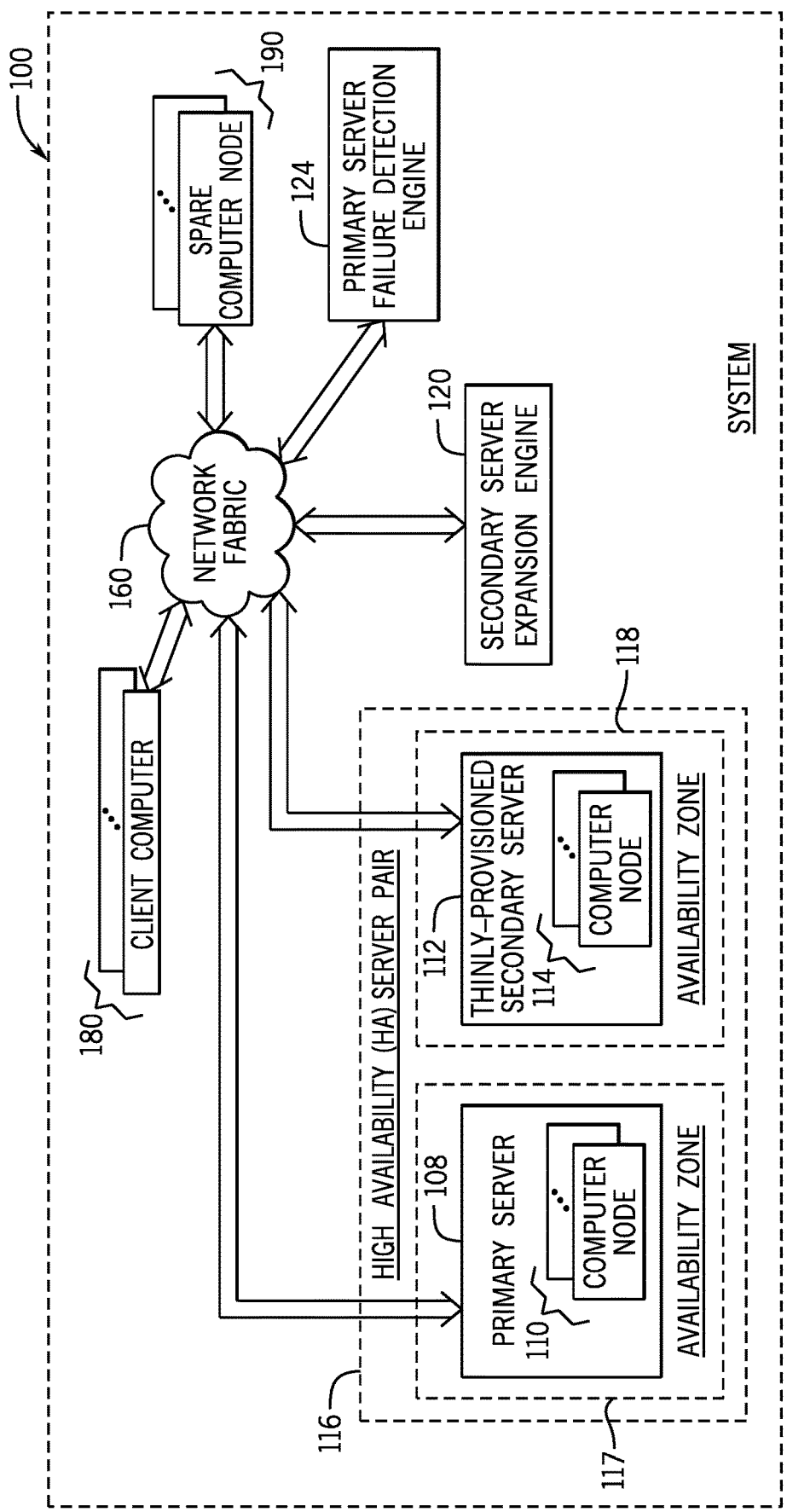
FIG. 1 is a block diagram of a system having a primary server, a thinly-provisioned secondary server and a secondary server expansion engine according to an example implementation.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims. The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "connected," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

A high availability (HA) system includes features (e.g., redundant software and hardware) that avoid single points-of-failure so that the HA system remains available even if failures occur. An HA system may include a primary server and a secondary server that is paired with the primary server. When the primary and secondary servers are used as part of a database management system (DBMS), the primary server may, for example, provide application services, resulting in updates (e.g., updates related to committed transactions) to a database state. The application services may include, for example, the primary server processing in-flight database transactions with customer computer systems The primary server may or may not keep the database state in the primary server's main memory. The secondary server maintains a database state so that should the primary server fail, the secondary server can take over for the primary server and quickly recover the operation of the running system.

The secondary server may not participate in providing application services, and instead, the purpose of the secondary server may be limited in scope (as compared to the primary server) to storing database changes (e.g., committed transactions) defined by the primary server after the primary server makes those decisions. The database changes may be recorded in log files on both the primary and secondary servers, and the database changes may be stored in fast persistent storage. The currency of the secondary server's copy of the database state may lag the primary server's copy of the database state due to the secondary server performing lazy updates of the database state by reading log entries, updating the database state, and deleting the log entries once the updates are committed to the database state. The state of the log and the state of the database are consistent with each other on both the primary server and the secondary server. If the secondary server makes all updates, then the database states on the primary and secondary servers are identical.

In one approach, the secondary server has the same size as the primary server. In this context, the "size" of a server refers to the physical resource allocation of the server, such as the available, physical memory, physical central processing units (CPUs), physical storage and physical network interfaces. As an example, with this approach, the sizes of the primary server and the secondary server may be the same. As a more specific example, the primary server may include a certain number of powered-up computer nodes (e.g., blade servers or rack severs), the secondary server may have the same number of powered-up computer nodes, and the same software (e.g., application software, operating software and/or any other software) may be installed on both servers.

Software used in or in conjunction with an HA system may make a distinction between using the primary server, in accordance with its primary role, to provide application services and sending updates to the secondary server so that the secondary server, in accordance with its secondary role, keeps its database state up-to-date (taking into account the log files). With the secondary server having conceptually up-to-date information consistent with the primary server, the secondary server is able to take over for the primary server (and thereby assume the primary role) and provide consistent application services, if the primary server fails, without any apparent disruption. In its standby secondary role, however, the physical resources of the secondary server may be considerably less than the physical resources of the primary server, as the function of the secondary server can be more limited. If the primary server never fails, the hardware and operational costs of a secondary server with identical physical resources as the primary server may be wasted expenses.

In accordance with example implementations that are described herein, a secondary server of an HA system is thinly-provisioned. A "thinly-provisioned" server, in the context used herein, refers to a server that has an apparent allocation of physical resources, which is less than the server's actual allocation of physical resources. Stated differently, the physical resources of a thinly-provisioned server are oversubscribed in that the server's virtual abstraction of the physical resources presents an abstracted view of the physical resources to the server's operating system, which does not correspond to the actual available physical resources. The thin provisioning of a secondary server, in accordance with example implementations, involves configuring the secondary server to have the minimum physical resource allocation needed for the secondary server to be able to perform its secondary role function(s), such as, for example, maintaining a consistent database state. From the viewpoint of the secondary server's guest operating system and executing applications, the thin provisioning creates an appearance of the secondary server having a greater physical resource allocation than the secondary server's actual physical resource allocation. This may be particularly advantageous for installing an operating system and applications on the secondary server, which expect a larger available physical resource allocation and do not recognize differences between the secondary and primary roles. Moreover, because the thin-provisioning reduces the secondary server's physical resource allocation, hardware and operational costs associated with maintaining the secondary server as a standby are reduced (as compared to, for example, fully provisioning the secondary server for its secondary role).

In accordance with example implementations, a secondary server expansion engine, responsive to a failure of a primary server, prepares a thinly-provisioned secondary server to take over for the primary server by increasing the actual physical resource allocation of the secondary server. The process to increase the actual physical resource allocation of the secondary server may be referred to as the "thickening" of the secondary server. As an example of thickening, the secondary server expansion engine may cause the actual physical resource allocation of the secondary server to be the same or nearly the same as the actual physical resource allocation of the primary server. As another example of thickening, the secondary server expansion engine may cause the actual physical resource allocation of the secondary server to be greater than the actual physical resource allocation of the primary server. The thickened secondary server, with its pre-loaded software and its maintained database state, may take over for the primary server.

In accordance with example implementations, the secondary server may be a software-defined server, or "SDS." In the context that is used herein, an "SDS" is a virtualized distributed system having a collection of physical computer nodes (e.g., blade servers, rack servers or other servers) that collectively form a virtual machine (VM) that hosts a guest operating system (OS). Stated differently, the VM runs across (or is "hosted by") the computer nodes.

The SDS architecture allows dynamic reconfiguration of the SDS's computer nodes without rebooting the guest operating system. More specifically, computer nodes may be added to an SDS and computer nodes may be removed from an SDS, all without rebooting or disrupting the guest operating system or any executing applications of the SDS. This allows computer nodes (e.g., fully powered-up and fully booted spare computer nodes) to be added to a thinly-provisioned secondary SDS to thicken the secondary SDS without restarting or disrupting the SDS's guest operating system or any of the SDS's executing applications. Consequentially, when an associated primary server fails, a thinly-provisioned secondary SDS may, in a seamless and time-efficient manner, be thickened and take over for the primary server.

FIG. 1 is a block diagram of an example system 100 that includes a high availability (HA) server pair 116, which includes a primary server 108 and a secondary server 112. The HA server pair 116 may be used for any of a number of purposes and applications. For example, the HA server pair 116 may provide at least part of a DBMS and provide database management-related application services. As other examples, the HA server pair 116 may provide file sharing services, e-commerce support and/or provide mission critical functions. Regardless of its particular purpose or use, in general, the HA server pair 116 provides a level of redundancy to avoid single points-of-failure, so that even if failures occur, a server is available to take over responsibility.

For the example purpose of providing at least part of a DBMS, the primary server 108, in its primary role, may be accessed by client computers 180 and provide application services, which results in, for example, the primary server 108 processing inflight transactions and committing updates to its database state. The secondary server 112, in its secondary role, may maintain a database state that is current with the primary server's database state so that should the primary server 108 fail, the secondary server 112 may take over for the primary server 108. The secondary server 112 may or may not preload the database state into its memory, depending on the particular implementation.

As depicted in FIG. 1, in accordance with example implementations, the primary server 108 may be located in one availability zone 117, and the secondary server 112 may be located in a different availability zone 118. In this context, an "availability zone" refers to a group one or multiple data centers. For example, the primary server 108 may be located in a data center in availability zone 117, and the secondary server 112 may be located in a different data center in availability zone 118. The availability zones 117 and 118 may, in accordance with example implementations, be in respective geographic regions that are sufficiently isolated such that an event (e.g., a natural disaster) in one region, which causes an outage for the datacenter(s) of one availability zone 117,118 would not be expected to cause an outage for the datacenter(s) of the other availability zone 117,118.

In accordance with example implementations, the HA server pair 116 may be used for purposes of disaster recovery (DR). For these example implementations, the HA server pair 116 may be located in respective geographic regions that are sufficiently isolated such that an event in one region, which causes an outage affecting the server would not be expected to cause an outage that affects the other server. The HA server pair 116 may not be part of a DR system, in accordance with further implementations. In accordance with some implementations, the primary server 108 and the secondary server 112 may be entirely located in respective data centers.

As depicted in FIG. 1, in accordance with example implementations, the secondary server 112 may be thinly-provisioned. More specifically, in accordance with some implementations, the secondary server 112 may be configured to have an apparent allocation of physical resources (e.g., an allocation perceived by an operating system and applications of the secondary server 112), which is less than the server's actual allocation of physical resources. Moreover, in accordance with example implementations, the secondary server 112 may be an SDS for which a VM runs across multiple computer nodes 114 (i.e., the VM is hosted by multiple computer nodes 114).

In the context that is used herein, a "computer node" refers to an electronic device that has a processing resource, which is capable of executing machine-readable instructions. Examples of computer nodes can include server computers (e.g., blade servers, rack servers or standalone servers), desktop computers, notebook computers, tablet computers, and other processor-based systems. As an example, the computer nodes 114 of the secondary server 112 may be blade servers or rack servers that are part of the same rack. As another example, the computer nodes 114 of the secondary server 112 may be blade servers that are located on multiple racks of the same data center. As another example, the computer nodes 114 of the secondary server 112 may be located in racks of multiple data centers. As another variation, the computer nodes 114 of the secondary server 112 may be rack servers or servers corresponding to categories other than blade servers or rack servers.

In accordance with example implementations, the computer nodes 114 contain the actual physical resources of the secondary server 112. Accordingly, adding a computer node to the server's collection of computer nodes 114 increases the actual physical resource allocation of the secondary server 112.

The system 100 may include a pool of available spare computer nodes 190. In accordance with example implementations, each spare computer node 190 may be fully powered-up and fully booted. As described further herein, one or multiple spare computer nodes 190 may be added to a secondary server 112 (to therefore expand the number of the computer nodes 114 of the secondary server 112) for purposes of thickening the secondary server 112. As an example, the spare computer nodes 190 may be located in the same data center as the existing computer nodes 114 of the secondary server 112. As other examples, the spare computer nodes 190 may be located in a different data center than the existing computer nodes 114 of the secondary server 112, or in accordance with further implementations the spare computer nodes 190 may be located in multiple data centers.

The primary server 108, the secondary server 112 and the spare computer nodes 190 may be interconnected by network fabric 160. The network fabric 160 may be associated with one or multiple types of communication networks, such as (as examples) Fibre Channel networks, Compute Express Link (CXL) fabric, dedicated management networks, local area networks (LANs), wide area networks (WANs), global networks (e.g., the Internet), wireless networks, or any combination thereof. As depicted in FIG. 1, in accordance with example implementations, the network fabric 160 may further connect the client computers 180 to the HA server pair 116 and further connect a secondary expansion engine 120 and a primary server failure detection engine 124 to the HA server pair 116.

The primary server failure detection engine 124 monitors the primary server 108 for purposes of detecting a failure of the primary server 108. As an example, the primary server failure detection engine 124 may be part of the secondary server 112. As another example, the primary server failure detection engine 124 may be part of a network switch. As another example, the primary server failure detection engine 124 may be part of a management server or an administrative server of the system 100.

In accordance with further implementations, the system 100 may have not a primary server failure detection engine 124, or even if the system 100 has a primary server failure detection engine 124, an indication that primary server 108 has failed and/or an indication that a takeover should occur, may be provided by another entity. For example, a client computer 180 may directly or indirectly trigger a failure corrective action when the primary server 108 is unresponsive. Therefore, the primary server failure detection engine 124 and the client computer 180 are examples of entities that may provide an indication that a takeover by the secondary server 112 should occur.

Regardless of its particular architecture or location, the primary server failure detection engine 124 uses a mechanism (e.g., a heartbeat mechanism or other mechanism) to detect failure of the primary server 108. Responsive to detecting the failure, the primary server failure detection engine 124 may then communicate an alert (e.g., a message or other notification) representing the detected failure of the primary server 108 to the secondary server expansion engine 120.

In accordance with example implementations, the secondary server expansion engine 120 is an example of a failover manager that is configured to, in response to a primary server failure alert, add one or multiple computer nodes to a thinly-provisioned secondary server 112 to prepare the secondary server 112 to take over for a primary server 108. In this context, the secondary server expansion engine 120 "adding" the computer node(s) refers to the secondary server expansion server taking one or multiple actions to at least initiate a process of increasing the number of computer nodes of the secondary server 112. In accordance with example implementations in which the secondary server 112 is an SDS, the secondary server expansion engine 120 adds the computer node(s) by ordering a thickening of the secondary server 112 (i.e., ordering one or multiple computer nodes to be added to the secondary server 112) by the SDS's VM.

As an example, the secondary server expansion engine 120 may be co-located with the primary server failure detection engine 124 (e.g., associated with a pair of processes on the same server). As an example, the secondary server expansion engine 120 may be part of the secondary server 112. As another example, the secondary server expansion engine 120 may be part of a network switch. As another example, the secondary server expansion engine 120 may be part of a management server or an administrative server of the system 100.

In accordance with some implementations, the primary server 108 may be an SDS that has a VM that runs across multiple physical computer nodes 110. In accordance with further implementations, the primary server 108 may be a virtualized distributed system of computer nodes, other than an SDS. In accordance with yet further implementations, the primary server 108 may be a non-virtualized distributed system or a non-distributed system.

As used here, an "engine" can refer to one or more circuits. For example, the circuits may be hardware processing circuits, which can include any or some combination of a microprocessor, a core of a multi-core microprocessor, a microcontroller, a programmable integrated circuit (e.g., a programmable logic device (PLD), such as a complex PLD (CPLD)), a programmable gate array (e.g., field programmable gate array (FPGA)), an application specific integrated circuit (ASIC), or another hardware processing circuit. Alternatively, an "engine" can refer to a combination of one or more hardware processing circuits and machine-readable instructions (software and/or firmware) executable on the one or more hardware processing circuits.

Figure 2:
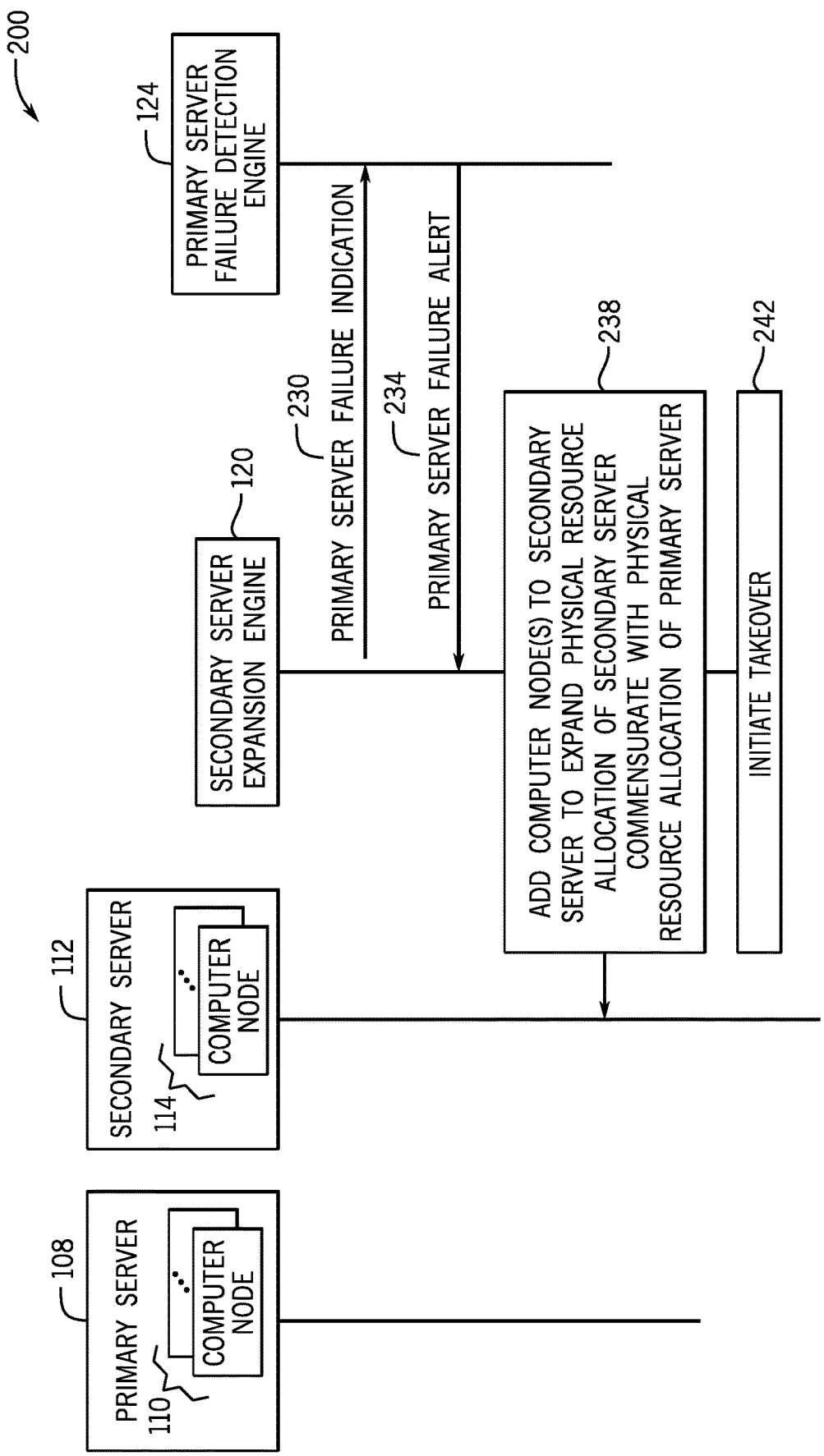
FIG. 2 is a flow diagram depicting a technique to prepare a thinly-provisioned secondary server to takeover for a primary server according to an example implementation.

Regardless of its particular location or architecture, in accordance with example implementations, the secondary server expansion engine 120 performs a technique 200 that is depicted in FIG. 2 in response to a primary server failure indication. Referring to FIG. 2, the technique 200 includes the primary server failure detection engine 124 receiving a primary server failure indication 230, which is a notification that the primary server 108 has failed. For the example implementation that is depicted in FIG. 2, the primary server failure indication 230 is provided by a primary server failure detection engine 124. However, in accordance with further implementations, the primary server failure indication 230 or more generally, an indication that a takeover should occur, may be provided by another entity. As an example, a client computer may provide a trigger to initiate the takeover.

In the context that is used herein, a failure of the primary server 108 generally refers to the primary server 108 being unable to function as intended. The failure of the primary server 108 may be attributable to any of a number of different reasons. As an example, the failure may be due to a power outage and/or a network outage that specifically affects the primary server 108. As another example, the failure may be attributable to a power outage and/or a network outage that affects a rack in which the computer nodes 110 of the primary server 108 are installed. As another example, the failure may be attributable to a power outage and/or a network outage that affects the primary server's data center or availability zone. As other examples, the failure may be due to a software or hardware problem specific to the primary server 108, or another reason (e.g., an unanticipated network partitioning caused by a hardware fault, a software bug or another reason).

As depicted in FIG. 2, in accordance with example implementations, in response to the primary server failure alert 230, the primary server failure detection engine 124 generates a primary server failure alert 234. In general, the primary server failure alert 234, in accordance with example implementations, initiates actions, which are taken by the secondary server expansion engine 120 to prepare the secondary server 112 to take over for the primary server 108.

More specifically, in accordance with example implementations, to prepare the secondary server 112 to take over for the primary server 108, the secondary server expansion engine 120 may cause one or multiple computer nodes to be added (as depicted at 238) to the secondary server's collection of computer nodes 114. This node addition expands the actual physical resource allocation of the secondary server 112 so that the allocation is commensurate with the actual physical resource allocation of the primary server 108. As an example, the server expansion engine 120 may cause computer nodes to be added to the secondary server 112 to expand the server's physical resource allocation to match (e.g., to be the same or nearly the same as) the physical resource allocation of the primary server 108. As another example, the server expansion engine 120 may cause computer nodes to be added to the secondary server 112 so that the server's physical resource allocation is greater than the physical resource allocation of the primary server 108.

The computer nodes that are added to the secondary server 112 may correspond to spare computer nodes that are part of a spare pool. Prior to the spare computer nodes being added to the secondary server 112, the spare computer nodes may have been fully powered up and fully booted. This promotes a time-efficient and seamless thickening of the secondary server 112 so that the secondary server 112 may rapidly and non-disruptively take over for a failed primary server 108. For example implementations in which the secondary server 112 is an SDS, the spare computer nodes may be located in the same data center (and possibly located in the same rack) as the existing computer nodes of the SDS.

As noted herein, the secondary server 112 may be an SDS, in accordance with example implementations. For these example implementations, hyper-kernel instances (also referred to herein as "hyper-kernels") of respective computer nodes 114 of the SDS present a unified view of hardware resources to a guest operating system (OS) of the SDS so that the guest OS has the view of a single larger computer containing an aggregated of resources (e.g., processors, memories, I/O resources, network communication resources, and possibly other and/or different resources). In accordance with example implementations, a virtual resource map of the SDS describes the virtual resources that are available from the point of view of the guest OS. Moreover, in accordance with example implementations, a physical resource map of the SDS describes the physical resources that are available on each of the computer nodes 114 of the SDS. In accordance with example implementations, the hyper-kernel instance of each computer node 114 creates and maintains a current resource map for purposes of describing the current mapping between the virtual resource map and the physical resource map from the point of view of the computer node 114.

The SDS's VM manages a physical resource map and presents the physical resource map to the guest OS. In accordance with some implementations, for a thinly-provisioned SDS, this presentation creates an appearance, from the viewpoint of the guest OS, of a physical resource allocation that is larger than the actual physical resource allocation for the SDS. Each hyper-kernel instance of the thinly-provisioned SDS has an accurate view of the physical resources being managed by the hyper-kernel instance. This allows an operating system and application software to be installed on the SDS, which expect the SDS to be sized the same as (or larger than) the primary server 108.

In accordance with further implementations, the guest OS may be able to distinguish between primary and secondary roles for the SDS. For these example implementations, for a thinly-provisioned SDS, the VM's presentation of the physical resource map to the guest OS may accurately portray the actual physical resource allocation.

In accordance with example implementations, as part of the expansion of the SDS, the secondary server expansion engine 120 causes the SDS to update its physical resource mapping information to include the additional physical resources that are available on the computer nodes that are being added to the SDS. Moreover, in accordance with example implementations, the secondary server expansion engine 120 may cause the SDS to update current resource mapping information between the SDS's virtual resources and physical resources. These updates, in accordance with example implementations, thicken the previously thinly-provisioned SDS and correspondingly expand the physical resource allocation of the SDS to be commensurate with the physical allocation of the primary server 108.

As further depicted in FIG. 2, after adding computer node(s) to the secondary server 112, the server expansion engine 120 may then, as depicted at 242, initiate the secondary server's takeover of the primary server 108. Stated differently, the secondary server 112, due to the takeover, is no longer associated with the secondary role but instead becomes the primary server and correspondingly becomes associated with the primary role. Moreover, in connection with the takeover, another server may be associated with the secondary role and thereby become the new secondary server of the HA server pair.

Figure 3:
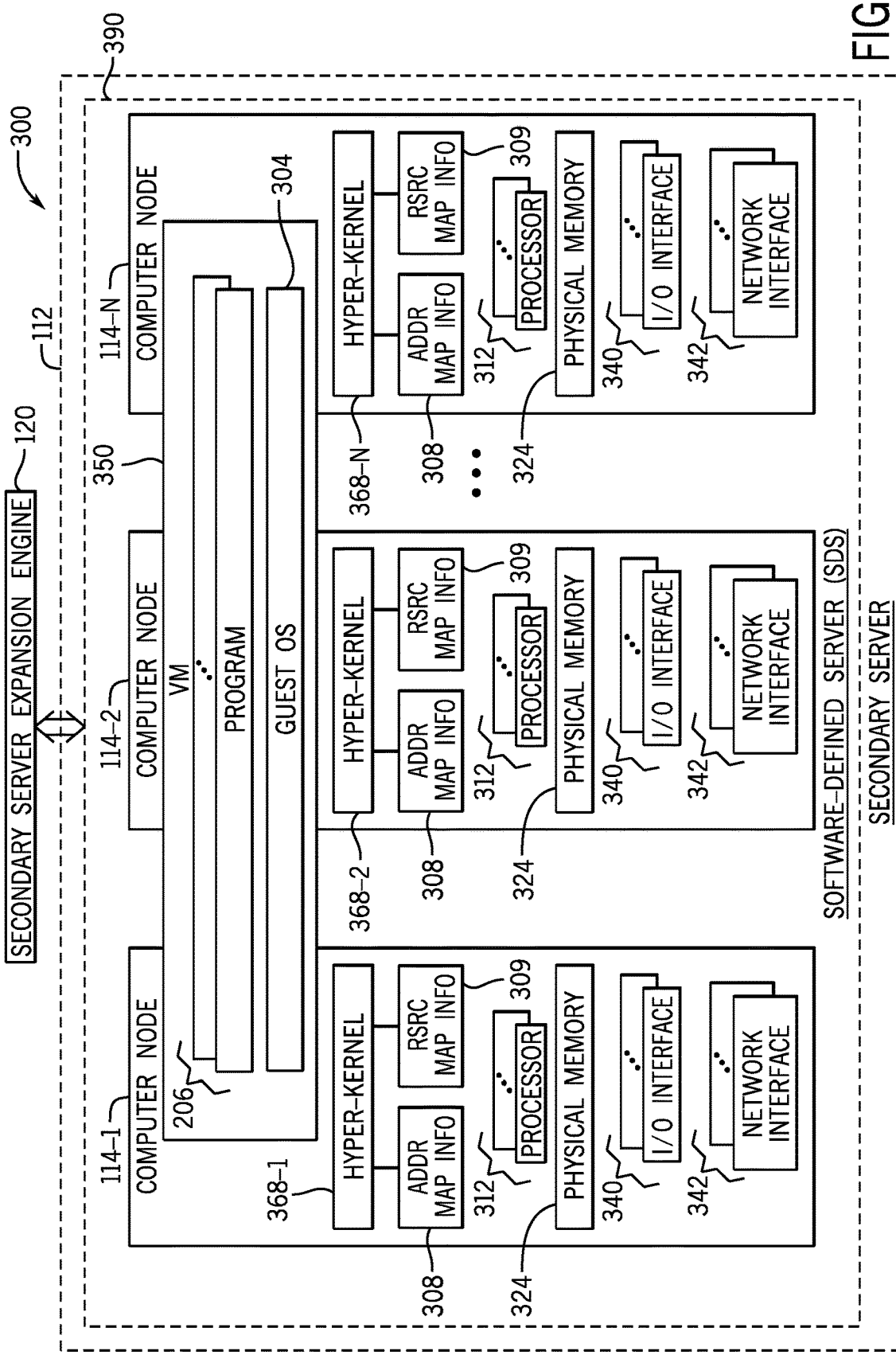
FIG. 3 is a block diagram of a secondary server illustrating a software-defined server-based architecture of the secondary server according to an example implementation.

FIG. 3 is a block diagram of a primary server failure response subsystem 300, in accordance with example implementations. The subsystem 300 includes the secondary server expansion engine 120, and the secondary server 112 is or includes an SDS 390. The SDS 390 includes a VM 350 that can run across N multiple computer nodes 114 (computer nodes 114-1, 114-2 and 114-N, being depicted in FIG. 3). Stated differently, the N computer nodes 114 host the VM 350. Although FIG. 3 depicts one VM 350, note that there can be at least one other VM that can run across the multiple computer nodes 114-1 to 114-N. The computer nodes 114-1 to 114-N collectively form one VM 350 that hosts a guest operating system (OS) 304 and a collection of programs 306 that run in the VM 350. Examples of OSes include any or some combination of the following: a Linux OS, a Microsoft WINDOWS OS, a Mac OS, a FreeBSD OS, and so forth.

A hyper-kernel 368 (or "hyper-kernel instance") on each physical computer node 114 functions as part of a distributed hypervisor. The hyper-kernels 368 communicate with each other to collectively perform tasks of a hypervisor. Each hyper-kernel 368 can observe the SDS 390 running in real time and optimize system resources of the respective computer nodes 114 to match the requirements of the SDS 390 during operation. The hyper-kernels 368 unify the hardware resources of the computer nodes 114 and present the unified set to the guest OS 304.

In accordance with example implementations, the hyper-kernels 368 perform the mapping of guest physical memory addresses to real physical memory addresses. The guest OS 304 performs the mapping of guest virtual memory addresses to guest physical memory addresses (using first level page table mappings). From the viewpoint of the guest OS 304, the guest physical memory addresses appear to be real physical memory addresses but are not. The VM 350 may maintain a virtual resource map that describes, from the point of view of the guest OS 304, the virtual resources that are available to the guest OS 304. In accordance with example implementations, the hyper-kernels 368 use second level page table hardware and second level address mapping information 308 to map guest physical memory addresses to real physical memory addresses. Each hyper-kernel 368 has address mapping information 308 that, from the viewpoint of the hyper-kernel 368, is a current resource mapping between the virtual resource map and the physical resources that are managed by the hyper-kernel 368. In accordance with example implementations, each hyper-kernel 368 has resource mapping information 309 that describes the physical resources that are managed by the hyper-kernel 368.

In accordance with example implementations, the hardware resources of each computer node 114 include a collection of physical processors 312 (a single processor or multiple processors). As used here, a "collection" of items can refer to a single item or multiple items. A processor can include a microprocessor, a core of a multi-core microprocessor, a microcontroller, a programmable integrated circuit, a programmable gate array, or another hardware processing circuit. As more specific examples, the processor 312 may be a CPU core, a collection of CPU cores, a CPU semiconductor package (or "socket"), a GPU core, a collection of GPU cores or a GPU semiconductor package.

In accordance with example implementations, the hardware resources of each computer node 114 include a physical memory 324, which can be implemented using a collection of physical memory devices. In general, the memory devices that form the physical memory 324, as well as other memories and possibly storage media that are described herein, are examples of non-transitory machine-readable storage media. In accordance with example implementations, the machine-readable storage media may be used for a variety of storage and computing-related functions, such as, for example, storing machine-readable instructions; storing data representing parameters, preliminary results, final results, and intermediate results; storing tables, storing actual physical allocation representations, storing available physical allocation representations, storing databases, storing database states, storing transaction logs, communicating alerts, communicate server health heartbeats, rankings; storing mapping information; storing system management-related parameters, as well as storing other data. The memory devices may include semiconductor storage devices, flash memory devices, memristors, phase change memory devices, a combination of one or more of the foregoing storage technologies, as well as memory devices based on other technologies. Moreover, the memory devices may be volatile memory devices (e.g., dynamic random access memory (DRAM) devices, static random access (SRAM) devices, and so forth) or non-volatile memory devices (e.g., flash memory devices, read only memory (ROM) devices and so forth), unless otherwise stated herein.

The computer node 114 may include various other physical resources, such as network interfaces 342, (I/O) resources, as well as physical resources belonging to other categories.

In accordance with example implementations, the distributed hyper-kernel may include the secondary server expansion engine. In accordance with further example implementations, the SDS 390 may contain the secondary server expansion engine, but the secondary server expansion engine may be external to the distributed hyper-kernel. In accordance with further implementations, the secondary server expansion engine may be associated with a single hyper-kernel instance 368 and be associated with a particular computer node 114. In accordance with yet further example implementations, the secondary server expansion engine may be external to the SDS 390 (e.g., located on a management server or an administrative server).

Figure 4:
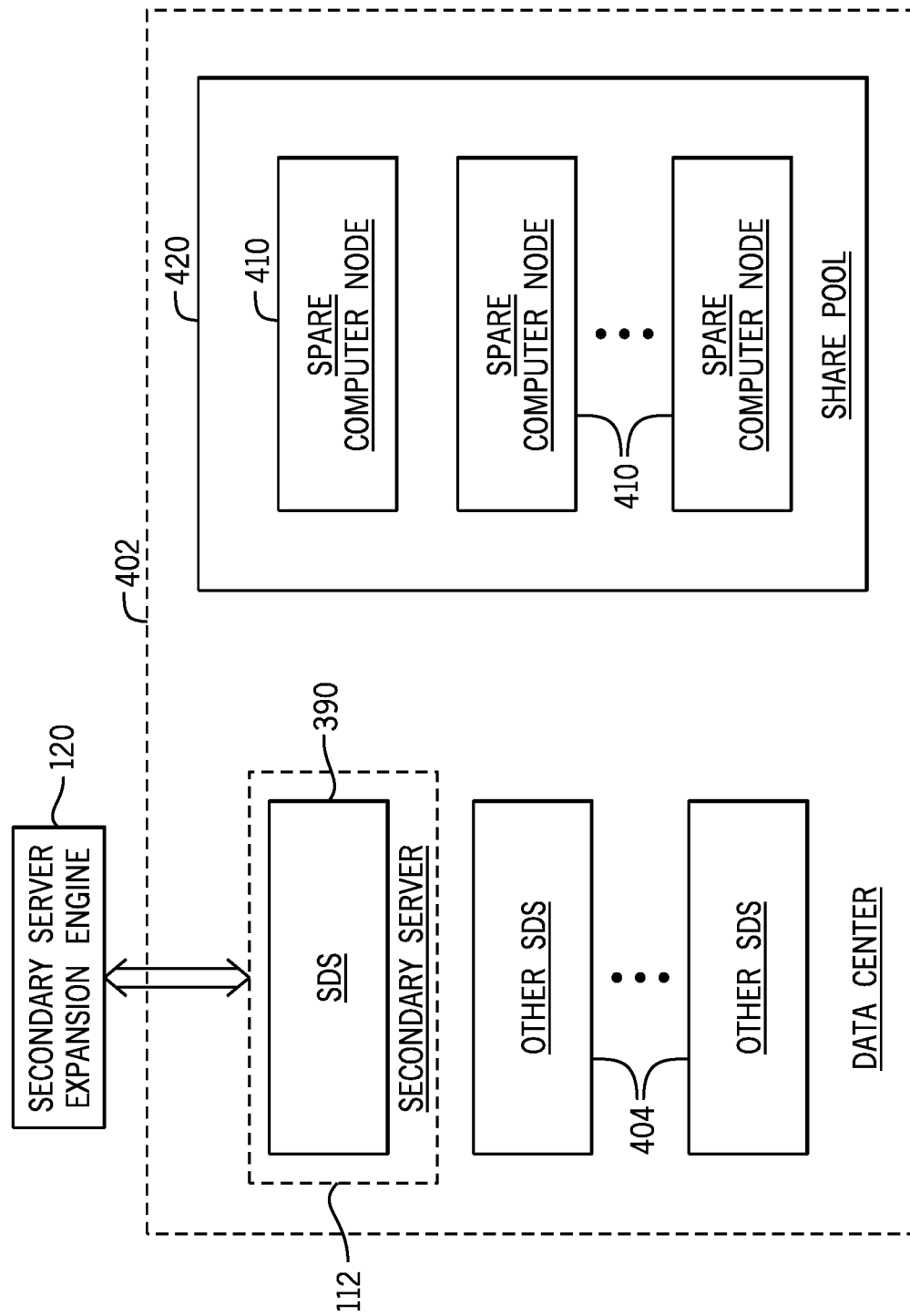
FIG. 4 is an illustration of the use of spare computer nodes for software-defined servers located in a data center according to an example implementation.

Referring to FIG. 4, in accordance with example implementations, the SDS 390 may be one of a group of SDSs (including one or multiple additional SDSs 404) executing, or running, across respective sets of computer nodes that are located in a particular data center 402. As an example, the SDS 390 may initially be a thinly-provisioned secondary server of an HA server pair, and later, due to the failure of the primary server of the HA server pair, the SDS 390 may be thickened and become the primary server of the HA server pair. The other SDSs 404 may, as examples, be thinly-provisioned secondary servers, primary servers, servers that are not affiliated with HA systems, a combination of any of the foregoing entities, or be used for different purposes. In accordance with example implementations, the SDS 390 may be part of an HA server pair where the other server of the HA pair may be an SDS that runs across computer nodes that are part of a different data center, availability zone and/or region.

As an example, the data center 402 may contain a spare pool 420 of fully powered-up and fully booted spare computer nodes 410, which are available for adding to the SDS 390 as well as adding to other SDSs 404. For example, the secondary server expansion engine 120 may add one or multiple spare computer nodes 410 to the SDS 390 for purposes of thickening the SDS 390 to prepare the SDS 390 to take over for a primary server.

In accordance with some implementations, the SDS 390 may be dynamically reconfigured, and this dynamic reconfiguration may be unrelated to the thickening of the SDS 390 for purposes of taking over for a primary server. As examples, the dynamic reconfiguration may be initiated automatically by the SDS 390 or initiated via a console of a management server. In accordance with example implementations, regardless of the particular type of dynamic reconfiguration, the dynamic reconfiguration may involve adding one or multiple spare computer nodes 410 to the SDS 390. As an example, the dynamic reconfiguration may be used for purposes of replacing a computer node of the SDS 390, which has failed. As another example, the dynamic reconfiguration may be for purposes of swapping out a computer node of the SDS 390 so that scheduled maintenance may be performed on the removed computer node. As another example, the SDS 390 may take over for a primary server, and subsequently, due to an increased job and/or application workload, the SDS 390 (now the primary server) may be scaled up to accommodate the increased workload. This scaling up may include adding one or multiple spare computer nodes 410 from the spare pool 420 to the SDS 390. As another example, the SDS 390 may take over for a primary server, and subsequently, due to a decreased job and/or application workload, the SDS 390 (now a primary server) may be scaled down to accommodate the decreased workload in a process that includes returning one or multiple computer nodes of the SDS 390 to the spare pool 420.

The number of spare computer nodes 410 in the spare pool 420 is dynamic and therefore, may change over time. In this manner, dynamic reconfigurations of the SDS 390 and the other SDSs 304 may continually add computer nodes 410 to the spare pool 420 and continually remove computer nodes 410 from the spare pool 420. Moreover, spare computer nodes 410 may be added to the spare pool 420 and removed from the spare pool 420 over time aside from additions/removals caused by dynamic reconfigurations. As examples, the minimum number of spare computer nodes 410 designated for the spare pool 420 may be increased, spare computer nodes 410 may fail, new spare computer nodes 410 may be installed, as well as additions and removals due to other reasons.

Referring back to FIG. 3, turning now to more specific details of the SDS 390, in accordance with some implementations, the SDS 390 may use mapping information to translate between virtual and physical configurations. For example, in accordance with some implementations, the mapping information may include a physical resource map, an initial resource map and a current resource map.

A "physical resource map" is a table that describes the physical resources that are available on each computer node 114. It contains, for example, the number and type of the processors on each node 114, the devices, the memory available and its range of physical addresses, etc. In accordance with example implementations, this table is read-only and is fixed at boot time.

An "initial virtual resource map" is fixed prior to the booting of the operating system and describes the virtual resources that are available from the point of view of the guest OS 304. The configuration is readable by the guest OS 304. In some cases, it may be desirable to configure a system (from the viewpoint of the operating system) that does not match, one-to-one, with the underlying hardware resources. As one example, it may be desirable for the guest OS 304 to have more memory and fewer cores. This can be accomplished by changing the ratio of memory to cores, i.e., by modifying the initial virtual resource map.

A "current resource map" is created and maintained by each hyper-kernel 368. This map describes the current mapping between the virtual resource map and the physical resource map from the point of view of each computer node 114. For each entry in the virtual resource map, a definition of the physical resources currently assigned to the virtual resources is maintained. Initially (e.g., at boot time), the current resource map is a copy of the initial virtual resource map. The hyper-kernel 368 modifies the current resource map over time as it observes the characteristics of the resource load and dynamically changes the mapping of physical resources to virtual resources (and vice-versa). For example, the definition of the location of an Ethernet controller in the virtualized machine may at different times refer to different hardware controllers. The current resource map is used by the hyper-kernel 368 to dynamically modify the virtual hardware resource mappings, such as the virtual memory subsystem, as required.

The hyper-kernels 368 provide a dynamic adaptive reconfiguration framework, which enhances system availability in a datacenter context by allowing dynamic reconfiguration of the SDS 390 without downtime due to failures or required (or desired) elasticity capacity changes to improve the efficient utilization of computing resources. That is, this additional layer of the hyper-kernels 368 allow for dynamic adaptive reconfiguration of the SDS 390 while the system is running, without having to bring the system down.

Dynamic reconfiguration, as referred to herein, refers to the capability of changing or modifying the set of hardware components implementing or supporting an SDS 390, while the system continues to run a guest OS 304 and its applications. For example, using the techniques described herein, the resources of a distributed multiserver architecture may be reconfigured while an operating system running across the multi-server architecture continues to run, without having to be rebooted, and without any disruption to a running application.

In accordance with example implementations, physical hardware components of the SDS 390 may be grouped and these groups may be associated with respective resilient logical modules (also called "logical modules" herein). In accordance with example implementations, as compared to physical hardware components a logical module has a relatively graceful failure mode, rather than an immediate catastrophic failure. As described herein, a graceful failure involves a transition to a degraded state such that the SDS 390 continues to function and no data is lost; depending on the degree of redundancy of available hardware, a later failure may be catastrophic if the failing component is not replaced.

This type of approach, in which a SDS 390 includes resilient logical modules, which through dynamic reconfiguration, allow a relatively high level of availability (e.g., "continuous availability" with an arbitrary number of "9's" of availability), despite physical hardware disruptions (e.g., due to hardware failures, physical resource scaling, etc.). The primary causes of data center downtime typically have to do with shrinking the system capacity, growing the system capacity, and component failures while running (where outage times increase as existing data center systems become larger). Using the resiliency/reconfiguration mechanisms described herein, these causes need not result in any downtime of the SDS 390. This also minimizes outage costs due to hardware (e.g., component failures, reconfiguration, repairs, etc.) by allowing for fail in place/scheduled repair, hot spares, etc., as will be described in further detail below. The outage costs due to software (e.g., software bugs, operator error, overload, etc.) are also reduced by allowing thin provisioning, which will be described in further detail below.

As described above, the dynamic reconfiguration mechanism described herein allows for various enhancements in system availability in a datacenter context, examples of which, without limitation, are by allowing dynamic reconfiguration of a SDS 390 without downtime due to failures, and by allowing required or desired elasticity capacity changes to improve the efficient utilization of computing resources. Using the techniques described herein, continuing operation of the SDS 390 is achieved despite hardware disruption (e.g., component failure, rescaling, etc.). Further details regarding such enhancements are described in further detail below.

The ability to facilitate required or desired capacity changes to the SDS 390 (i.e., dynamic reconfigurability of the SDS 390) is referred to herein as "thin-provisioning" of the SDS 390. One advantage of the hyper-kernel described above is that it creates a layer of software in between a guest OS 304 and the underlying hardware. As a result, the hardware and the guest OS 304 and its applications are more loosely coupled than as compared to previous data centers. Thin provisioning leverages and exploits this loose coupling, allowing available virtual resources to move from hardware node to node, and be remapped onto physical resources dynamically (e.g., via the resource migration techniques described above). For example, storage volumes, memory, and central processing units may be instantiated by physical resources as needed, rather than be chosen and fixed in capacity for the duration of operation of the SDS 390. As one example, a SDS 390 may be started with 1 TB (terabyte) of physical DRAM (dynamic random access memory) and 10 physical processors, and then later on have its physical instantiation be upgraded, while the system is running, to have more DRAM and more CPUs, without having to restart the guest OS 304.

Because virtual memory pages, virtual CPUs, Input/Output (I/O) devices, and other virtual resources are mobile throughout the SDS 390, and are dynamically reconfigurable, the virtual machine supported/presented by the hyper-kernel, using the techniques described herein, may add and remove sufficient physical resources that support the virtual resources, and then re-map them to additional or different physical resources. This provides flexibility to scale the system's hardware capacity up and down with a workload's requirements, as needed, resulting in a more efficient utilization of computing resources.

Indirectly, this also provides a form of resiliency, not only to failures, but also to utilization economies. Using the dynamic reconfiguration mechanism described herein, expanding and shrinking workloads may be easily and automatically accommodated. For example, excess resources can be used by other SDSs until needed, and power requirements of the SDS 390 can be adjusted proportional to the needs of the workload.

The ability to dynamically reconfigure a SDS 390 without downtime due to failures allows for fail-in place and further allows, for example, the scheduling of repairs. The dynamic reconfiguration mechanism described herein thus has an additional benefit for resiliency. Physical devices may be taken out of service for repair, replacement, or upgrades, while the SDS 390 and its guest OS 304 continue to run. Replaceable devices may be removed from the SDS 390 with disrupting it. Moreover, physical devices may remain in place for an arbitrary period until a removal for replacement or upgrade can be scheduled. Such flexibility is an improvement to existing data center environments, where the techniques described herein both reduce downtime by allowing the system to continue running, while at the same time allowing the appropriate repairs to be done properly, without, for example, the need for "emergency on-call specialists."

Further details regarding handling of hardware faults while allowing the SDS 390 and its guest OS 304 to continue to run are described below.

As used herein, a "component" refers to any hardware portion of the SDS 390, such as a chip, a board, a housing, a cable, etc. In contrast, as used herein, a "module" refers to a combination or collection of one or more physical components that are combined to create or provide an abstract function of the SDS 390 or hyper-kernel. One property of the SDS 390 module is that the module's hardware function may be understood without understanding the details of its constructions, and that its operational state may be described efficiently.

In accordance with example implementations, resilient commodity hardware components with fault-tolerance are used in the SDS 390 (and to create modules), such as error-correcting code (ECC) memory, processor over-temperature slowdown, software redundant array of independent disks (RAID), multipath storage over fabric, bonded networks, etc.

Examples of types of modules in a SDS 390 are described in further detail below. In various embodiments, modules include: a node (e.g., one or more processor chips, a motherboard, its power supply, and a number of memory DIMMs (dual in-line memory modules), etc.), the interconnect network (e.g., the switches, cables, and NICs (network interface controllers) that provide inter-node connectivity), and an addressable guest network interface (e.g., one port on a hardware NIC).

As used herein, a resilient logical module (also called a "resilient module" or a "module" herein) fails gracefully (e.g., degrades rather than fails). Resilient modules include devices that fail into a degraded state. While suffering reduced performance, resilient modules continue to function, such that there is no data loss. However, a failure while in a degraded state may be catastrophic. Degraded components are those that need replacement in a timely manner to maintain system resiliency. Examples of such components include commoditized ECC memory, RAID1/5 volumes, bonded NICs, redundant power supplies, etc.

In accordance with example implementations, a resilient module in a SDS 390 is a logical assembly of one or more hardware components that may be described as having one of five operation states: available, operational, degraded, failing and broken. An available module is a module that is ready for use in a SDS 390, but is not actually in use. An operational module is a module that is connected to the SDS 390 and is being used by the hyper-kernel. An operational module is functioning correctly with full performance.

A degraded module is a module that is connected to the SDS 390, and is being used by the hyper-kernel. Although it functions correctly, its performance may be substandard, and should be replaced in a timely manner, or it will enter the failed operational state. A failed module is a module that is connected to the SDS 390 and causes the hyper-kernel to fail. A failed module does not function correctly.

A broken module is a module that is not connected to the SDS 390. If a broken module were connected to the SDS 390, it would cause the hyper-kernel to fail. A broken module does not function correctly. A SDS 390 whose connected modules are each operational or degraded is functioning. A SDS 390 with any modules that are failing is not working. Available and broken modules are not connected to the SDS 390, and have no effect on system availability.

Logical modules are designed to fail gracefully. Using resilient physical components such as error-correcting memory, CPU modules that reduce their clock speed when overheating, software RAID, redundant switches, bonded network ports, etc., as described above, the majority of failures (e.g., 99.9%) will be those that fail gracefully and degrade, and result in transitions from the operational to the degraded state. That is, the most common data center failures may be made into resilient modules (e.g., power supplies, network connections (connectors, NICs), disk drives, ECC memory, etc.). Failure of a redundant component leads to degraded module operation, but the system stays up, needing repair. Those failures that cause transitions from the degraded state to the failing state will then be to cover second failures. In contrast, only a small number of failures (e.g., 0.01% of failures) will be those that directly transition a logical module from the operational state to the failing state.

Available modules may be added to or detached from the SDS 390.

Broken modules may be detached from the SDS 390 or repaired in place (e.g., reseating a network cable). Broken modules should not be added to an SDS 390.

As used herein, reconfiguration of the SDS 390 refers to a process of binding and unbinding logical modules to physical components, and virtual machine components to logical modules. The distinction between logical modules and physical components is a form of virtualization (albeit, a type of virtualization different from the virtualization of processors, memory, and I/O devices to create a virtual machine that is performed by the hyper-kernel). In accordance with example implementations, enhancing the hyper-kernel by adding the capability of dynamic reconfiguration involves creating a separation that allows for the substitution of hardware components upon which the hyper-kernel operates. For example, the hyper-kernel is divided into two layers. One layer includes logical modules (described in further detail below), which manage certain physical resources in the SDS 390. The second layer is referred to as an "upper layer" of the hyper-kernel that works with any logical modules on any node.

In an example implementation, the logical modules, representing hardware components or other clumps of hardware resources/components in the hyper-kernel, are implemented as data tables. As will be described in further detail below, one example of a logical module is one that represents a physical disk drive. The corresponding data table describes, for example, where the disk drive is in the SDS 390, what transactions are outstanding to the disk drive, etc. Thus, the logical module includes the metadata about the physical components maintained by the hyper-kernel. As the logical module is not hardware, the logical module may be migrated. That is, a logical module implementation is free to migrate its use of physical components, and physical components may be moved transparently. The migration of logical modules may be performed without the knowledge of the guest OS 304. That is, this layer of logical modules is hidden from the guest OS 304.

Thus, in the dynamic reconfiguration framework described herein, the hyper-kernel runs on an assembly of logical modules that are bound at any particular time to physical components. In turn, the hyper-kernel provides a set of virtual resources forming a virtual machine to the guest system, also by binding and unbinding virtual resources to logical modules. The dynamic reconfiguration layer described herein includes a layer, the logical module, that cuts across the architecture of the hyper-kernel.

There is a split between logical modules and virtualized objects. The hyper-kernel includes an internal layering of resilient logical modules that degrade rather than break. This allows for the dynamic reconfiguration of a SDS 390 while the guest OS 304 continues to run, as well as the thin provisioning of physical resources. The dynamic reconfiguration technique described herein also provides a solution to two aspects of resilience, in that the system may continue to run despite failures of hardware components in resilient modules, and there is no downtime for scale changes or preventative maintenance.

In accordance with example implementations, hardware components (of which there may be a wide variety that serve similar functions) may be abstracted into a number of logical module types: node, time base, net port and storage volume.

In accordance with example implementations, a node logical module (also referred to as a "logical node" herein) corresponds to a hyper-kernel node. Internally, the node logical module has CPUs and memory. A node logical module may also hold other logical components of the other logical module types. Holding represents a higher-level aspect of reconfigurability.

In accordance with example implementations, there is a one time base logical module in an SDS 390. The time base logical module represents the time base of the SDS 390 that is used, for example, to synthesize virtual timestamp-counters and various virtual hardware clocks in the system. In one example implementation of a SDS 390, a time base logical module is the master clock and is logically part of a specific node module.

A bus port logical module represents a high-speed interconnection from a logical node to the other logical nodes that are attached to an Internet switch. In accordance with example implementations, there is one bus port logical module in each operational node logical module.

A net port logical module represents a network interface port. For example, a Virtio network virtual device may be implemented using a netport logical module. A storage volume logical module represents a logical drive controller. For example, a Virtio block virtual device may be implemented using a storage volume logical module.

The relationship between logical modules and physical components in the SDS 390 is not necessarily one-to-one. In accordance with some implementations, drivers are used that translate between operations on the logical module and the physical components. In various implementations, this may involve mapping logical module identifiers to physical component identifiers, but may also involve more complex mappings when multiple physical components are used to create a logical module that is resilient and reconfigurable.

Physical components of a distributed logical module may span multiple nodes. Logical modules may relocate, at any time, the function to span a different set of nodes. In accordance with example implementations, relocation is function-specific. For example, to remove a computer node: network interfaces switch MAC addresses to a NIC port on another computer node; local drive array spanning nodes in RAID5 structure simply drop a drive on a computer node and add an empty driver on another; and with respect to the time base logical module, the primary moves itself to another computer node, and drops the current computer node. The guest OS 304 is unaware of the relocation. The relocation process introduces no disruption in function.

In accordance with example implementations, the logical module interface in the dynamic reconfiguration framework described herein is defined by a set of commands that are issued by the hyper-kernel that is using the logical module. Commands may perform their job/task either immediately or asynchronously. In accordance with example implementations, completion of each asynchronous command is signaled through a completion queue. As one example, each completion is delivered as a kernel event (also referred to herein as a "kevent") on a kernel queue (also referred to herein as a "kqueue") specified in the command parameters when the command is issued. Other types of completion queues may be implemented.

In accordance with example implementations, each logical module in a SDS 390 has a unique identifier, also referred to herein as its "logical module ID" (LMI). The scope of LMIs is global to the SDS 390, during the lifetime of the SDS 390 as an entity. The node logical modules have their own LMI, which is a node identifier used in the hyper-kernel. As one example, the node identifier is used in the upper half of the hyper-kernel. In one example implementation, LMIs are represented as 12-bit unsigned integers (allowing for 4096 logical modules in an SDS 390) and may be stored wherever node identifiers are stored (for example in data structures used for resource tracking of pages). The LMIs may be as large as needed.

Logical modules may be relocated infrequently, for example, only when reconfigurations occur. Commands issued to a logical module on one computer node may need to be transmitted to another computer node. In an example implementation, updates to logical module locations maintain a strictly consistent mapping of logical module locations across all computer nodes (which may be in contrast to the resource tracking used for virtual resources in the hyper-kernel, where the per-node knowledge of the location of virtual resources may be imperfect).

In accordance with example implementations, the dynamic reconfiguration framework is implemented in part by an application programming interface (API) that is used by the hyper-kernel. The API may include commands issued to logical modules as procedure calls. In accordance with example implementations, a dedicated interconnect is used to turn a local procedure call into a remote procedure call.

For example, the API for logical volumes includes multi-block commands such as readblox, writeblox, and flush. The API also includes Async, for distributed completion queues. The APIs may be extended for guest memory transfer for block I/O, for example to inject guest page (even if current page at a guest physical address is remote) and to link to guest page (e.g., copy on guest page move).

In accordance with example implementations, a logical module is distributed across several computer nodes (while the computer nodes themselves are not distributed). For example, the logical module's components may span multiple computer nodes at any one time. By instantiating certain types of logical modules on multiple nodes at once, resiliency or performance may be enhanced. During reconfiguration, when a logical module's function is being replaced by new physical components on a new node, the transient state of the logical module is distributed. Since the hyper-kernel continues to run while reconfiguration is happening, the operation of the logical module is managed across multiple nodes during this period. Distributed logical modules also allow for quick computer node removal by abandoning components.

One feature of a distributed logical module involves using internal messages between nodes for internal coordination of the parts of the distributed logical module. Ordinary interconnect messages are addressed from the logical module implementation on one node to the logical module implementation on another node. The logical module implementations do not need to deal with virtual objects, so they need not interact with any of the hyper-kernel threads directly. In an example implementation, they are implemented with remote procedure classes that run in response to messages.

In an example implementation, a logical module command to the local module is a procedure call that returns quickly after doing its work. A command to a module that is not local to a computer node will be sent to one of the computer nodes involved in the module, and will return, for example, when the remote command handler returns. In accordance with example implementations, remote asynchronous commands forward kevents to kqueues specified by the command issued.

In modern hardware systems, certain components are physically embedded in computer nodes. For example, memory, processors, and I/O devices, in particular, are often embedded in computer nodes. Thus, repairing and replacing such components typically involves removing the computer node from the system, even if most of the computer node continues to operate.

Consequently, some node logical module holds each of the non-node logical modules of the system. In this context, "holding" refers to a binding that represents that a logical device is implemented by physical components attached to a node logical module. For example, a physical NIC found in a particular physical node may be configured to implement a logical NetPort module, and the physical node may be implementing a logical node module. In this example case, the logical node holds the logical NetPort module. A virtual network device is then bound to the logical NetPort module.

In accordance with example implementations, a computer node includes logical modules that are used to manage physical processors in the SDS 390. For example, the logical module is implemented as a thread data structure in a host operating system, such as FreeBSD. This allows, for example, a standardized VCPU to be presented to the guest OS 304. The physical processors across the computer nodes of the SDS 390 may be heterogeneous, with different capabilities, not all of which are presented to the guest OS 304. The logical module corresponding to the standardized VCPU includes information defining what capabilities of the physical processor are provided/not provided. Thus, a standardized set of identical VCPUs may be presented to the guest OS 304, even if the hardware CPUs are different (where the virtualized CPU is implemented on the logical module, which in turn is implemented on the physical resource).

As another example, pages of memory in the SDS 390 may also be associated with logical memory modules, where a logical module for a virtual memory page includes information about the pages of virtual memory when it is local on the node, such as its GCPP entry. When a page of virtual memory is migrated, the corresponding logical module is also migrated as well. Treating each page of virtual memory as a logical module may involve no additional overhead, because the SDS 390 architecture uses the same data structures to handle page motion between nodes.

As another example, physical network adapters may be associated with virtual network adapters that are presented to the guest OS 304. For example, there may be two physical network adapters on different computer nodes of the SDS 390. In an example implementation, in the hyper-kernel, there may be a logical network adapter (an example logical I/O adapter) that is implemented by the two different physical network adapters on each of the two computer nodes. While the guest OS 304 is aware of the virtual network adapter (which it believes to be hardware), it is unaware of the logical network adapter. The logical network adapter includes the information to make the two actual physical network adapters work together to behave as a single adapter. For example, this information includes information such as the location of the two physical network adapters, so that the two computer nodes on which the physical network adapters are located are aware of each other. When the virtual network adapter moves, the logical element of the hyper-kernel (logical network adapter) also moves in order to continue to work. Thus, in this example, the guest OS 304, running in the upper-level of the hyper-kernel, is not aware of the logical module. The logical module includes the information about the two physical network adapters (e.g., location information), and makes decisions about which of the physical network adapters is used to implement a request by the guest OS 304 to the virtual network adapter. That is, the internal structure of the logical module includes such information about how to apply instructions to the different physical adapters.

Certain logical modules may be implemented in a distributed fashion, spread across multiple nodes. Such logical modules, referred to herein as "distributed logical modules" are held by all of the nodes involved. As an example, certain storage volume logical modules, such as those that have multipath capability implemented in either hardware or emulated in the dynamic reconfiguration framework/subsystem described herein.

The treatment of modules held across multiple computer nodes generalizes the treatment of modules held by one computer node. In accordance with example implementations, in order to remove a computer node, all modules held by that computer node are made non-operational. For such multi-node modules, this includes changing the module's distributed implementation so that the computer node being removed no longer holds it. The opposite may also be performed, as an operational computer node may be added as a holder of a distributed logical module.

In accordance with some implementations, for purposes of removing a physical node, both the logical node module and all logical modules it holds are removed. In one example implementation, a logical module is removed based on the following criterion being satisfied: the logical module is no longer operational and is thus, unused by the hyper-kernel. Another logical module takes over the functions of the removed module.

The holding relationship is one difference between node logical modules and other types of logical modules, which also affects the ordering of reconfiguration steps. For example, suppose that there is a net port logical module, New, that is available and that meets criteria for taking over from another the net port logical module, Old, that is to be removed. Before the removal of Old, which is in, for example, either an operational or degraded state, the virtual logical binding of the virtual network port is changed from using Old to using New instead, and the status of Old is changed to available. This includes assigning the Media Access Control (MAC) address used by Old to New, then waiting for all operations in progress on Old to complete, while directing new operations to use New. When Old is no longer operating, Old transitions into either an available state or a broken state.

In accordance with example implementations, before removing a node logical module from the SDS 390, the node logical module should no longer contain any guest state. In particular, guest pages and VCPUs should not be active on the node logical module. The process of removing guest pages, VCPUs, and I/O devices is referred to herein as "evacuation." In the hyper-kernel architecture described herein, evacuation includes the hyper-kernel mobilizing VCPUs, pages, and I/O, using, for example, the resource migration mechanisms described above.

An issue in evacuation is the handling of guest pages that are "wired" to a node logical module. In some existing systems, certain guest pages may be permanently mapped, for example, to user space pages, for unbounded periods of time. As another example, certain pages may be wired into memory, where such pages would have to be moved from one memory module to another. In accordance with example implementations, the hyper-kernel makes all virtual pages mobile among the node logical modules (i.e., no "wired" pages), such that the virtual pages may be moved at any time. In an example implementation, the SDS 390 does not map guest pages to user space, and I/O device emulations deal with pages that move by stalling on access to a non-local page, then either requesting the page be moved to the node logical module where the emulation is running, or else moving the I/O device emulation thread to the node logical module containing the virtual page.

Therefore, the dynamic reconfiguration layer described herein is supported in part by guest pages not being "wired" to a particular node logical module. This allows, in accordance with example implementation, for evacuation of pages from a node logical module to be possible at all times. As a note, transfers of data into or out of a guest page do not "wire" the page. In accordance with some implementations, transfers, whether by a VCPU or I/O emulation, are performed as a unit operation that holds the guest page in memory only long enough to complete the transfer. In accordance with example implementations, two mechanisms avoid many I/O related data copies: replacing a guest virtual page with a page of non-guest memory, and creating a "copy-on-write" clone of a guest virtual page. Otherwise, I/O emulations break up their transfers into chunks within pages, and perform the transfers to/from each virtual page, one at a time.

VCPUs may migrate to a different logical node whenever they stall. To evacuate any VCPUs that happen to be on a node, a stall is invoked, and upon that stall, a migration of the VCPU takes the VCPU off of the node. Similarly, virtual pages may be removed at any time to another node, by an operation that moves the owner of the page. For pages that are secondary copies (e.g., of read only pages), these pages may be deleted without transferring the page anywhere.

In accordance with example implementations, the evacuation of all virtual pages is performed by looping over all pages in the logical node, and sending each guest virtual page to another operational logical node in the SDS 390. Similarly, in an example implementation, evacuating of all VCPUs is performed by looping over all VCPUs in the logical node, triggering stalls that force each VCPU to move to another operational logical node.

Two example issues to be dealt with during evacuation while the SDS 390 is operating are: resource tracking and migration blocking. Regarding the resource tracking issues, in accordance with example implementations, all virtual resources (e.g., VCPUs, virtual pages, and virtual I/O devices) are tracked by a distributed resource-tracking algorithm that keeps track, on each logical node, of where the resource was last sent. In an example implementation, tracking data includes a chain of node pointers that are followed to find a resource that is not on the current logical node. When a resource is moved during evacuation, other logical nodes in the system may still be operating under the assumption that the resource is on the evacuated logical node. Consequently, the evacuated logical node may receive requests for those resources that have moved. Typically, these messages would be forwarded to the logical node to which the resource has been moved, but this may not be possible once the evacuated logical node becomes non-operational.

Regarding the migration blocking issue, in accordance with example implementations, in order to complete or finish evacuating a logical node, resources should not move to that logical node. Consequently, other logical nodes should be notified to not send resources to the evacuating node.

The above two example issues are addressed using the following example evacuation process, which proceeds in multiple steps. First, the evacuated logical node informs all logical nodes that it is no longer a destination for migration of VCPUs, guest virtual pages, or virtual I/O devices. The evacuated logical node may still receive requests for resources, which the local node (or hyper-kernel on the evacuated node) handles or forwards as appropriate during the evacuation phase. Next, the evacuated logical node then begins evacuating pages, VCPUs, and virtual I/O devices that are present.

Each evacuated resource generates a special location update message, which is broadcast to all other logical nodes by the evacuated logical node, indicating that a resource has moved from the evacuated logical node to the new logical node (i.e., a message that notifies other nodes of the updated location of the resource). In accordance with example implementations, evacuation location updates are bundled into messages (e.g., of medium size, or any other size, as appropriate) on the interconnect, reducing the overhead on the interconnect (e.g., to a small ~16 bytes/resource).

Upon receiving an evacuation location update for a resource R moved to logical node N from evacuated logical node E, a logical node checks where the node believes R is, and if it is E, then the logical node accepts N as its new location for the resource R. When the evacuation of logical node E is complete, node E broadcasts an evacuation complete message (indicating completion of the evacuation of resources) and waits for response from all other nodes (acknowledging receipt of the evacuation completion message).

When a logical node receives an evacuation complete message from logical node E, the receiving logical node scans its own local tables to verify that no resource is now thought to be on logical node E and if that is true, responds with an evacuation OK message. If not, then the receiving logical node sends one or more evacuated location request(s) for locations of all resources still thought to be on logical node E.

When logical node E receives evacuation OK messages from all logical nodes, logical node E moves out of the operational state. While waiting for the evacuation OK messages, logical node E handles evacuation location request(s) responding with evacuation location update messages.

I/O mobilization supports the ability to allow a virtual I/O device to be re-bound to a different logical module on a different logical node. There are two bindings that are involved: virtual-to-logical, and logical-to-physical. A virtual I/O device is mobile, as the virtual I/O device may be accessed from any VCPU, and the virtual I/O device may access any virtual page without having to move the logical module or physical devices used in its implementation. Consequently, in accordance with example implementations, the evacuation process handles the virtual I/O devices, whereas the logical device bindings are handled by the logical module binding's move from one physical node's components to another.

Storage devices come in many varieties. Locally attached drives, removable drives, network attached storage, and fabric attached storage are but some examples of the various options that may be used. In the SDS 390, such storage devices are represented by a single type of (possibly distributed) logical module, the storage volume logical module (also referred to as a "logical storage volume" herein). In particular, in accordance with example implementations, the hyper-kernel virtualizes block devices (e.g., whether using Virtio or emulating Peripheral component Interconnect Express (PCIe) hardware interfaces) using a common internal storage volume API, which provides, for example, queued asynchronous I/O requests within a logical node (and which may be optimized, for example, for handling virtual 4K page-sized and page-aligned blocks). As a note, some operating systems such as Linux, FreeBSD, and Windows are designed to attempt to use page granularity on their disk file systems wherever possible, and keep page-aligned storage caches wherever possible. While they can support different disk block sizes in their file system code, they typically use their virtual memory layer to manage their disk caching, so their unified disk caches only cache page sized, page-aligned blocks.

In accordance with example implementations, the higher-level hyper-kernel emulates block devices using the common storage volume interface. For example, in accordance with example implementations, the hyper-kernel implements emulations of Virtio-block Advanced Host Controller Interface (AHCI)/AT Attachment Packet Interface (ATAPI), as well as NVME Express (NVMe) virtual devices. As a note, NVMe, though defined for hardware implementation, has benefits as a guest interface for storage virtualization as compared to the Virtio-block interface, because it uses natural 4K page-sized transfer, and supports more efficient queueing protocols. In some implementations, such emulations (run, for example, on virtual I/O processors, also referred to herein as "VIOPs") acquire command chains containing descriptors from queues in guest virtual memory, and translate those commands into block level commands to logical storage volumes. The virtual block device emulation code does not need to know how the storage volume effective "drivers" implement devices, and the storage volume drivers do not need to have knowledge about guest virtual memory, interrupt signaling, etc. This separation of concerns provides reconfiguration flexibility.

A logical storage volume may be distributed among multiple logical nodes (i.e., a distributed logical module), and therefore any or all of the logical nodes may be involved in a particular block-level command. For example, a logical storage volume may be implemented using multiple disk drives across several nodes, where the drives are mirrored using Redundant Array of Independent Disks (RAID), or striped to allow parallelized transfers to/from different logical nodes. In accordance with example implementations, the logical storage volume driver code is configured to route block-level commands to the right disk drive(s) on the correct node.

In accordance with example implementations, all virtual storage volumes may be configured to have 4K block size. Zero copy of virtual-logical data transfers may be performed by mapping. Logical volumes are independent of physical volumes, where RAID/multipath redundancy is managed by the hyper-kernel.

As a second example, a fabric-attached logical storage volume supporting multipath access may be connected to several logical nodes, again presented to the hyper-kernel as a distributed logical storage volume across some or all of those logical nodes (or only to a single one of the logical nodes). In this example case, block-level commands issued to the distributed logical storage volume may be directed to any one of the elements of the distributed storage volume.

A reconfiguration may temporarily put a logical storage volume in a distributed state, as the paths to content and contents themselves are transferred among logical nodes.

In accordance with example implementations, the interface to the logical storage volume deals with page-sized blocks. For writing to the Logical storage volume, one or more blocks are provided to the logical storage volume, the transfer is done, and the block is released back to the system.

For reading from the logical storage volume, one or more blocks are provided to the logical storage volume, the transfer is done, and the block is released back to the system with the contents updated. Transfer completions are signaled on a completion queue, along with a status block indicating the transfer's success/failure. In one example implementation, the completion queues use the kernel event mechanism (kqueue) in the operating system FreeBSD. In accordance with example implementations, a flush command is provided that allows forcing of one or more blocks into stable storage. The same interface may be used even when the transfer is smaller than a block, where, for example, only a portion of a page-sized block is read or written in the physical device.

The use of page-sized and page-aligned blocks results in the most common case of I/O involving only re-binding of the current instance of a virtual memory page. This is more efficient than copying data multiple times. In most cases, I/O may be done with zero memory-to-memory copies. Reading data from a drive into a block creates a new memory page on the node containing the device. Once the read is complete, the memory page is substituted in the guest virtual memory for the page that is the guest's I/O target. During I/O, the old page still takes up space in memory. However, once the I/O operation begins, the page will ultimately be erased. Thus, as soon as the I/O operation is queued, the hyper-kernel may erase the page. If the target of the I/O is, in actuality, on another node, this is not consequential. While the page read is in progress, the target page may be erased and a dormant instance moved to the node performing the I/O. In accordance with example implementations, pages in the system that have not yet been zeroed are indicated as "dormant" pages. In accordance with example implementations, these dormant pages are zeroed on an ongoing basis or are not zeroed until the first time that they are used (e.g., allocated and written into or created). When the page read is complete, the new contents are in a page that may be substituted for the dormant page. If the dormant page moves off of the node in the interim (which may be unlikely as it will not typically be accessed), the new contents of the page may be sent to wherever the page has moved.

Writing data from a block to a drive is similarly optimizable. In an example implementation, the page to be written should be on the node of the logical storage volume driver (if distributed, the page may be moved to whatever node can most efficiently perform the write). If not already there, a copy may be used. The page may become designated as a PRIMARY page, moved to the device as a SECONDARY copy of the page, leaving the PRIMARY page where it is (where PRIMARY and SECONDARY are examples of states that a page or copy of pages may be in). This creates a "copy-on-write" situation for the guest page during the time the write of the block is in progress. The virtual page instance being used by the logical storage volume may be moved or deleted, but the instance will retain its contents, and is not freed until the write operation is complete. In an example implementation, this feature is implemented by adding a flag to each page in memory marking the page as in-use by a logical storage volume write.

Logical storage volumes contain large amounts of guest data that must be preserved, and will continue to be accessed during dynamic reconfiguration. Thus, when a logical node is removed, the data in any logical storage volumes held by the node should be preserved. Different preservation processes may be used depending on how the logical storage volume is implemented in physical media. However, in all cases, the same command to the logical storage volume may be used to accomplish the preservation, where this command to the logical storage volume is referred to herein as logical storage volume relocation.

In accordance with example implementations, a logical storage volume is relocated from one set of nodes containing devices to a new set of nodes containing the same or other devices. The command issued to the Logical storage volume (which is aware of how and on which nodes it is currently implemented) specifies the target set of nodes to be used (which may overlap with the current set of nodes used), and any new devices on those nodes that may be used. The Logical storage volume driver is configured to carry out the steps to implement the relocation. During relocation, the logical storage volume expands to include the source set of nodes and the target set of nodes, then shrinks or contracts to include only the target set of nodes. This expansion/contraction approach allows the APIs to the logical storage volume to hide information regarding the internal implementation of logical storage volume drivers from the rest of the hyper-kernel.

For a multipath-capable fabric-connected storage, relocation includes updating the set of nodes from which the remote storage device may be accessed, and initializing any new connections in the relocation target set, while shutting down any connections on the nodes being dropped from the relocation set. Since the contents are remote, there is no transfer of contents.

As another, more complex example, a single volume that involves one or more locally attached drives on a single computer node may be relocated. One example approach involves transferring the contents by moving the physical drives themselves from slots on one computer node to slots on another computer node. In this approach, there may be a short time (which may be on the order of several seconds) during which the drive will be inaccessible to the guest. Further, a human operator may be needed to manually move the physical drives, which if done incorrectly, may cause the system to crash. Other approaches that improve system availability are described below.

As another approach, suppose that there are spare, empty locally attached drives on other computer nodes (e.g., on the replacement node taking over from the node that is failing), or a remote fabric-attached backup storage device. A relocation may be performed by copying the contents from one volume to another. Assuming the computer node being removed is continuing to run adequately, such a migration may be performed, but may take time. The logical volume becomes temporarily distributed across two logical nodes and internally manages the commands to be redirected to the device containing the current copies of blocks as they are copied.

As yet another example, a more complex form of local storage may avoid having to keep a degraded node running for a long time while its logical storage volumes are copied off. In an example implementation, this example form involves using RAID-style distribution of parts or portions of a RAID volume across multiple computer nodes. For example, a logical storage volume may be implemented as a RAID5 array across four computer nodes, each containing one drive. Each pair of logical blocks would be represented as three physical blocks on three successive drives, where two of the physical blocks are the logical blocks' contents, and one of the physical blocks is the parity block, which contains the bitwise exclusive-or of the logical blocks' contents. If it is detected that one of the four drives fails, then the logical storage volume transitions to the degraded state. However, the physical contents of that drive may be reconstructed by combinations of bits from the physical blocks on the other three drives. Thus, a single drive failure may be handled by adding a new, empty drive on any node to the RAID distributed volume—this is an example of a relocation operation. However, if one of the nodes degrades in some other way, the drive on that node may be reconstructed in the same way without requiring the drive on the degraded node at all.

Thus, one beneficial result of locally distributed Logical storage volumes using RAID5 style structures is that nodes may be replaced quickly, leaving the reconstruction of Logical storage volume contents on that node to be done at leisure after the reconfiguration is complete.

One potential cost of using a distributed Logical storage volume of RAID5 style across multiple computer nodes is that writes to the Logical storage volume may be slower, as any write involves an update to both the logical block and to the parity block. Instead of one write, this requires an extra write, and possibly a read of the other logical block covered by the parity block, if it is not in memory. By distributing the physical devices across computer nodes, at least one block's worth of data may also have to be transferred between nodes, as well. However, the RAID structure also has performance advantage, where, for example, it allows high-speed loading of data into memory, because of the doubling of bandwidth from physical storage into memory Block I/O is accomplished through a common API internal to the hyper-kernel that communicates to the logical storage volume abstraction, implemented by a logical storage volume driver. In accordance with example implementations, logical storage volume drivers are implemented on multiple nodes, as distributed logical modules. Distributed logical modules may be relocated so that one or more nodes no longer hold the logical storage volume. Such relocation is one way to replace a node holding a logical storage volume.

The logical storage volume is designed in such a way as to hide many details of common storage systems from the guest virtual machine supported by the hyper-kernel distributed virtual machine manager, which instead is presented and sees simple block drives. In accordance with example implementations, the details of storage devices, connectivity, etc. may be reflected through to the guest OS 304, which may then handle these details on its own, even through the mappings provided by inverse virtualization across nodes. However, it may be more beneficial to apply the modularity achieved by inverse virtualization to hide complexity from the guest OS 304, while at the same time allowing better performance and higher resiliency.

The logical storage volume abstraction described above creates a strict separation between how virtual block devices obtain their instructions from the guest OS 304, and how those instructions are mapped to commands issued on physical devices.

In accordance with example implementations, another category of I/O devices (in addition to the block devices described above) is network interfaces. In contrast to logical storage volumes, network interfaces need not manage "contents." Substituting one physical NIC port for another may be performed. For example, the MAC address, one aspect of a NIC port that uniquely identifies the NIC port, may be reassigned quickly (e.g., in milliseconds).

The SDS 390 splits the emulation of a guest network interface port (e.g., implemented using Virtio-Net, or any other standard, as appropriate), into two parts—the guest facing upper half, and net port logical modules (also called "logical net ports") that handle all of the issues of dealing with the physical hardware.

In contrast to block devices, where guest operating systems typically perform I/O using page granular, page-aligned buffers, existing operating system networks are typically not well organized for zero-copy transfers organized around page-sized units. As one example, the structure of I/O operations to net ports is as follows. Commands are issued to the net port logical module, either synchronously or asynchronously, to read a packet or write a packet to the physical device currently being used by the net port to implement the logical network port. In accordance with example implementations, when a packet is being sent, it is copied out of guest virtual memory to a list of real local memory blocks by the hyper-kernel, and this copy is provided to the net port logical module. In some cases, the copy will be to an mbuf (an example of a memory buffer) on the node where the page resides, with the mbuf being provided to the logical module. This simplifies the sending from/ through a local device or a remote device, as mbufs are used in the hyper-kernel for both.

The net port logical module may transfer the copy across the dedicated network interconnect from where the copy was made to the physical device's node. This copy may be smaller than a page, and avoids the need to copy a large amount of other data in the page to the device, resulting in a reduction in interconnect traffic. Upon completion, the status is put in a completion queue.

In accordance with example implementations, packets being received are placed in local memory buffers, which are returned in a completion queue, using, for example, the command/completion queue interface described above. In accordance with example implementations, the memory buffers are provided to device emulation code, which copies them into guest virtual memory. Again, in accordance with example implementations, an mbuf chain is used as the form of data returned upon completion of a packet receive. The mbuf chain may then be copied into the virtual pages a chunk at a time, and if the pages are remote, the mbuf chain may be transferred over another interconnect that is configured to handle mbufs as part of its packets.

In accordance with example implementations, initialization of a computer node places the corresponding logical node module in the available state. A shutdown of a computer node may be performed after the corresponding logical node module is in either the available or the broken operational state. Details regarding removal of a node have been described herein, which places the logical node into the available or broken operational state. In the available and broken states, the hyper-kernel and logical modules are still functional, their data structures that track logical modules and memory state are initialized, etc. These states may have similarities. One example of a distinction between available and broken is that a computer node affiliated with the broken state undergoes repair before the computer node is added back to a SDS 390, whereas a computer node affiliated with the available state is ready for use.

In accordance with example implementations, a computer node affiliated with the available state is powered up and ready to be added to a SDS 390. In accordance with example implementations, the initialization of a computer node occurs before the computer node is affiliated with the available state.

The shutdown of a computer node may, in accordance with example implementations, include various steps, where for example, some state may need to be saved before powering the node off (i.e., state preservation may be performed during shutdown). In accordance with example implementations, in order to implement the dynamic reconfiguration framework described herein, the initialization of the hyper-kernel is structured into two steps, with a third step that starts the SDS 390. In accordance with example implementations, each logical node is initialized separately, bringing the node to the available operational state. In accordance with example implementations, this initialization does not involve interaction among the logical nodes, as the node initializations may occur in parallel. In an example implementation, the recipe or process for initializing each logical node is communicated to the logical node in textual form.

The initialization of the hyper-kernel may next include applying SDS-specific parameters to one or more logical nodes, putting them into operational states. In accordance with some implementations, two types of descriptions are included at this point: SDS-wide parameters (e.g., guest address space size, number of VCPUs, etc.), and a definition of the logical modules that are to be held on each logical node, initially.

The initialization of the hyper-kernel may next include selecting a single logical node as the "boot node" and providing bootstrap information, which starts the SDS 390. In accordance with example implementations, all VCPUs and non-dormant memory are initialized on the boot node. However, after such initialization, there is no distinction or difference between the boot node and other logical nodes. For example, the boot node may not even be logical node 0. One characteristic of the boot node is that the VCPUs are initially found on that node.

In accordance with example implementations, any computer node may be removed (e.g., either to scale down needed resources or to perform replacement due to failure). This includes the computer node associated with the boot node, which as described herein, after initialization, is no longer differentiated from other logical nodes.

In accordance with example implementations, the SDS 390 may be administered from an administrative node, such as administrative node 499 of FIG. 4. The administrative node may issue service commands relating to node actions during startup, reconfiguration, removal, etc. In accordance with some implementations, the administrative node may not be used to maintain operation of the SDS 390, thereby preventing the administrative node from becoming a single point of failure that will cause the SDS 390 to fail. The administrative node may provide monitoring/management capabilities to manage physical components in the SDS 390. For example, the administrative node may perform external monitoring of physical component health and allows for manual or automatic failure response. In accordance with example implementations, the nodes of the SDS 390 maintain configuration and health information used by the administrative node in case the management service fails. In an example implementation, the SDS 390 provides ports on each node (which may also be replicated) that may be used to administer each node by any (authorized) node that provides the administration server. These ports provide a path for logging data about operations, collecting system health information, or other information. In accordance with example implementations, these ports also support a protocol that allows for querying the current system configuration status. Rather than keeping system configuration in an external structure, which could be inconsistent or unreliable, the dynamic reconfiguration layer on each node provides introspection capabilities such that a new administrative may discover the information needed to administer the SDS 390, should the first administrative node.

The functionality of the introspection interfaces provides the ability to inventory all logical modules currently operating in the SDS 390, all nodes whether operational or not, and the physical devices in each node, along with their usage by logical modules. This is also a point of coordination with an administration console. In an example implementation, the administration console for the SDS 390 is a program running outside the hyper-kernel that controls the dynamic configuration changes by using the introspection interfaces. In accordance with example implementations, the administration console is implemented within a separate computer connected to the SDS 390, or on one of the hardware nodes of the system as a process that runs concurrently with the hypervisor. If it is implemented on one of the SDS's nodes, then it is stopped and restarted on another computer if the node is to be removed from the server.

In accordance with example implementations, the time base logical module (also called the "time base module" herein) is responsible for ensuring the invariants related to guest virtual time across all nodes of the SDS 390. The design invariants of time sources and time event sources in the hyper-kernel are twofold: virtual time does not "go backwards" from the guest operating system's point of view; and the virtual time maintains a constant rate relative to external wall clock time, as seen through all virtual time sources and time event sources. The invariant rule regarding "going backwards" may be complex, as there is a causal ordering between time as read from virtual clock devices and guest virtual memory contents. For example, if two VCPUs read the same clock, the ordering of memory operations they carry out before and after the clock readings should conform to a causal serialization of the memory accesses carried out by the VCPUs. Causal ordering is assumed for correctness in many guest synchronization techniques that use, for example, the time stamp counter (TSC) of the Intel instruction set along with memory access ordering constraints.

In accordance with example implementations, these invariants are achieved in the SDS 390 by using a single distributed very high-resolution clock that is effectively synchronized among every pair of logical nodes (e.g., with less than microsecond disparity among every pair of nodes), and a rule that effectively delays each guest-level transfer information between nodes such that such a transfer never arrives at a local time earlier than it was sent. If the interconnect has a transfer latency greater than the disparity between the pairs of logical nodes, then there may be no need to delay at all, unless the time synchronization allows time to diverge. This may be achieved by controlling the effective rate of the virtual clock so that each node's virtual clock has an identical rate on an order of, for example, parts per-million.

With respect to the time base logical module and dynamic reconfiguration, maintenance of synchrony and rate are also taken into account during adding or removing of a logical node. For example, a new logical node is synchronized to the existing logical node when the new logical node becomes operational.

In accordance with example implementations, the interconnect among the computer nodes of the SDS 390 is made resilient by increasing redundancy. In accordance with example implementations, the dynamic reconfiguration framework achieves this by using multiple ports on each computer node and multiple switches, such that the failure of a switch or a cable merely degrades performance, but an alternate (redundant) delivery path exists.

In an example implementation, the hyper-kernel assumes in-order message delivery, and the interconnect protocol manages the choice of paths to a particular node destination internally to the bus port logical module, which corresponds, for example, to the network kernel implementation of the hyper-kernel. In accordance with example implementations, selection of paths and detection of failed paths are performed in the network kernel driver. Thus, multiple network ports on a computer node are represented at the reconfiguration framework API by a single bus port logical module.

Future growth of the SDS 390, such as the expansion of a thinly-provisioned SDS 390, may involve the addition of more computer nodes than were originally part of the SDS 390 at start up. The implication of this is that the set of logical nodes actually in use may vary over time. In an example implementation, in order to handle multiple switches, multiple ports, etc., the interconnect protocol is configured so that it separates logical node identifiers from physical layer constraints. When broadcasting hyper-kernel messages, logical nodes that are not operational need not receive or handle such hyper-kernel broadcasts, as this may introduce failures if they do. In accordance with example implementations, hyper-kernel broadcast is implemented such that there is a "multicast group" that is maintained for all logical nodes that are operational, and that the hyper-kernel broadcast operations use this multicast group, rather than a total broadcast (which may result in broadcast to non-operational logical nodes as well).

In accordance with example implementations, unicast messages may be sent to a logical node, whether operational or not. This capability may be used for messages used for purposes of managing a reconfiguration of the SDS 390 (e.g., messages communicated for purposes of adding another computer node and the corresponding logical node to the SDS 390). In accordance with example implementations, reconfiguration also uses broadcast to all nodes on a segment—this may be used for administration functions to determine the state of all nodes, not only the operational nodes, while the system is running.

In accordance with example implementations, a dynamic reconfiguration framework for the SDS 390 divides the hyper-kernel into two layers, one dealing with implementation of a single scalable virtual hardware system (e.g., single scalable virtual hardware system), and a lower layer that provides abstractions of logical Modules used to implement all of the functions used to allow for dynamic reconfiguration while the SDS 390 continues to run. The logical modules may encapsulate mechanisms of fault tolerance by supporting operation of a particular logical module in a "degraded" state when a hardware component associated with the logical module fails.

In accordance with example implementations, an external management system, (e.g., implemented in a console of an administrative node) ss configured to detect/monitor for the signals that indicate hardware component failures. The signals may be provided by the various per-node hyper-kernels. Each hyper-kernel may listen for failure-identifying signals, for example, by polling physical components and/or obtaining reported values from physical components.

The hyper-kernel may detect failures in components by accessing status information collected by a server motherboard. For example, the server motherboard may collect and/or report the performance of various hardware components attached to the motherboard (e.g., the memory chip, processor, fans, block devices, network devices, etc.). This may include telemetry data, such as temperatures, voltages, fan speeds, errors detected and corrected, etc., which are collected, for example, in memory registers that, while not seen by the guest OS 304, are accessible by the hyper-kernel. In accordance with example implementations, a per-node hyper-kernel is configured to poll the node's motherboard for such telemetry information. In other embodiments, the motherboard reports such telemetry information to the hyper-kernel. The hyper-kernel may then pass the telemetry information to the external management system (where the hyper-kernel may also perform processing on the telemetry information (e.g., summarizing, such as determining counts of events, rates of events, etc.) before it is passed to the external management system).

The hardware may periodically (e.g., based on a timer interrupt) reports the state of the hardware, which may be read by the hyper-kernel. For example, there may be various registers throughout the system, such as on motherboards and processors, that indicate what faults have occurred. The fault may be a fault that does not change the behavior of the processor. As one example, consider a memory fault that is detected. The detected memory fault may be recorded and stored in a register of the motherboard. In existing systems, such telemetry information that is collected on motherboards is typically not reported anywhere off of the basic register that captures the telemetry information. In an example implementation, the hyper-kernel makes use of such information to identify failing/degrading hardware devices/components.

In an example implementation, the hyper-kernel observes the count of correctable memory errors. For example, a bank of memory may use the count to determine the rate of correctable errors on any time scale as appropriate (e.g., correctable errors per minute, per hour, etc.). In a typical computing system, the rate of correctable errors that are detected may be on the order of zero per hour or zero per week. As the system ages however, the rate of correctable errors may increase, for example, to one or two correctable errors per month. While the memory may not be completely unusable (i.e., the memory is in a degraded state) and need not be removed entirely, such information may be used by the hyper-kernel to initiate remediation actions to address the degraded component before it fails.

Figure 5:
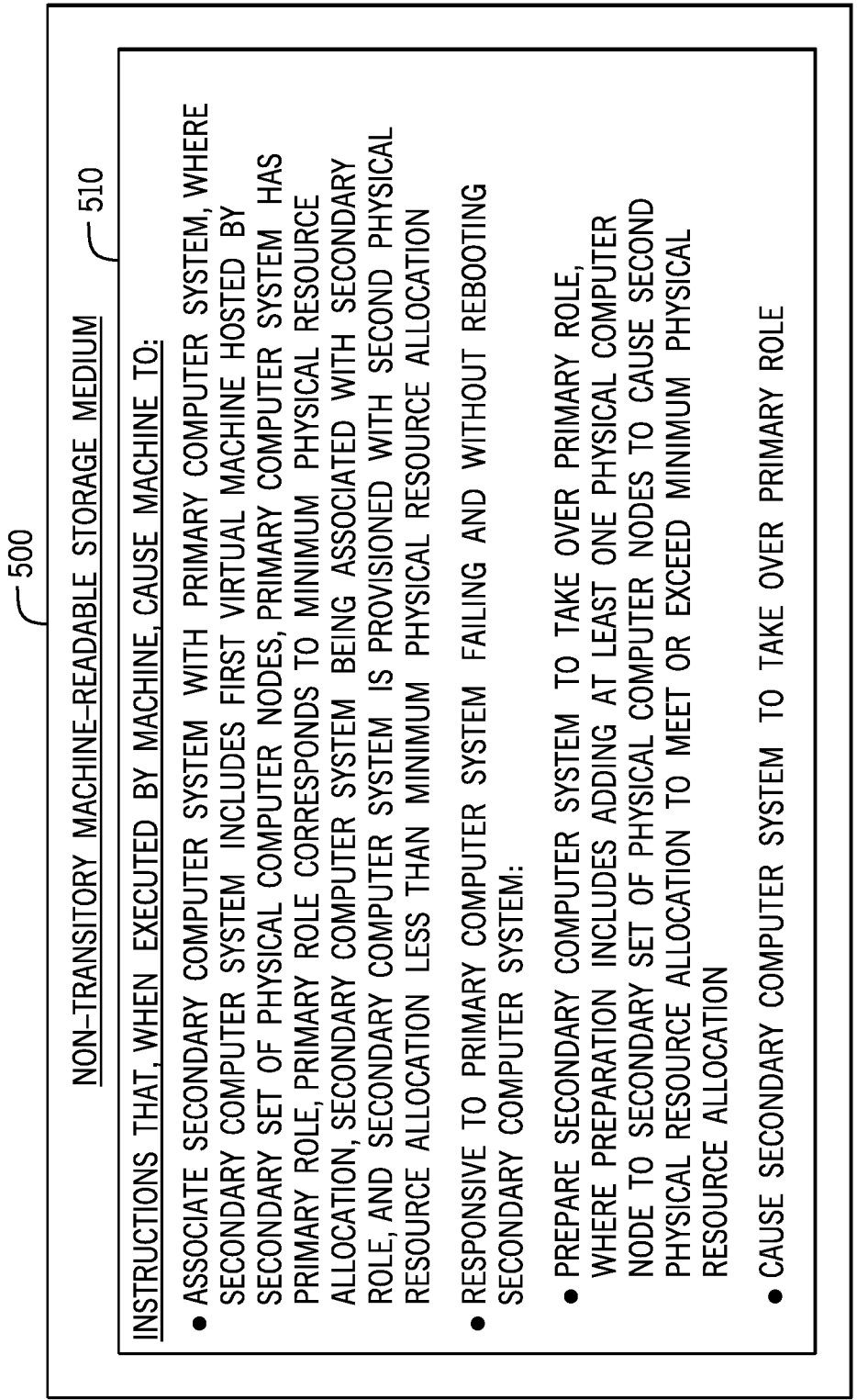
FIG. 5 is an illustration of machine-readable instructions that are stored on a non-transitory machine-readable storage medium to cause a machine to, without causing a secondary server to reboot, add at least one physical computer node to the secondary server to prepare the secondary server to takeover for a primary server according to an example implementation.

Referring to FIG. 5, in accordance with example implementations, a non-transitory machine-readable storage medium 500 stores instructions 510. The instructions 510, when executed by a machine, cause the machine to associate a secondary computer system with a primary computer system. In accordance with some implementations, the primary computer system may be in a different availability zone than the availability zone of the secondary computer system. In accordance with some implementations, the primary computer system and the secondary computer system may be respective servers of a high availability (HA) system. In accordance with some implementations, these servers may be part of a disaster recovery (DR) system. In accordance with some implementations, the secondary computer system may be a software-defined server (SDS). In accordance with some implementations, the primary computer system may be an SDS.

The secondary computer system includes a first virtual machine that is hosted by a secondary set of physical computer nodes. The primary computer system has a primary role, and the primary role corresponds to a minimum physical resource allocation. In accordance with some implementations, the minimum physical resource allocation corresponds to an actual minimum physical resource size to allow the primary computer system to perform a set of functions (e.g., application service-related functions and database functions). The physical resources may include, as an example, processor, memory, I/O, storage and network resources of the primary computer system.

The secondary computer system is associated with a secondary role. The secondary computer system is provisioned with a second physical resource allocation, which is less than the minimum physical resource allocation. In accordance with some implementations, the second computer system may be thinly-provisioned, and the second physical resource allocation may be sized to support some part (e.g., database management) of the functions performed by the primary computer system but not all of the functions (e.g., the second physical resource allocation may not be sufficient for the secondary computer system to provide application services).

The instructions 510, when executed by the machine, further cause the machine to, responsive to the primary computer system failing and without rebooting the secondary computer system, prepare the secondary computer system to take over the primary role. The preparation includes adding at least one physical computer node to the secondary set of physical computer nodes to cause the second physical resource allocation to meet or exceed the minimum physical resource allocation. In accordance with some implementations, preparing the secondary computer system to take over the primary role includes thickening a thinly-provisioned secondary computer system. Thickening the thinly-provisioned secondary computer system may include updating resource mapping information of an SDS.

The instructions 510, when executed by the machine, may further cause the machine to cause the secondary computer system to take over the primary role. In accordance with example implementations, in connection with the secondary computer system taking over the primary role, another computer system (e.g., a thinly-provisioned SDS) is designated as having the secondary role.

Figure 6:
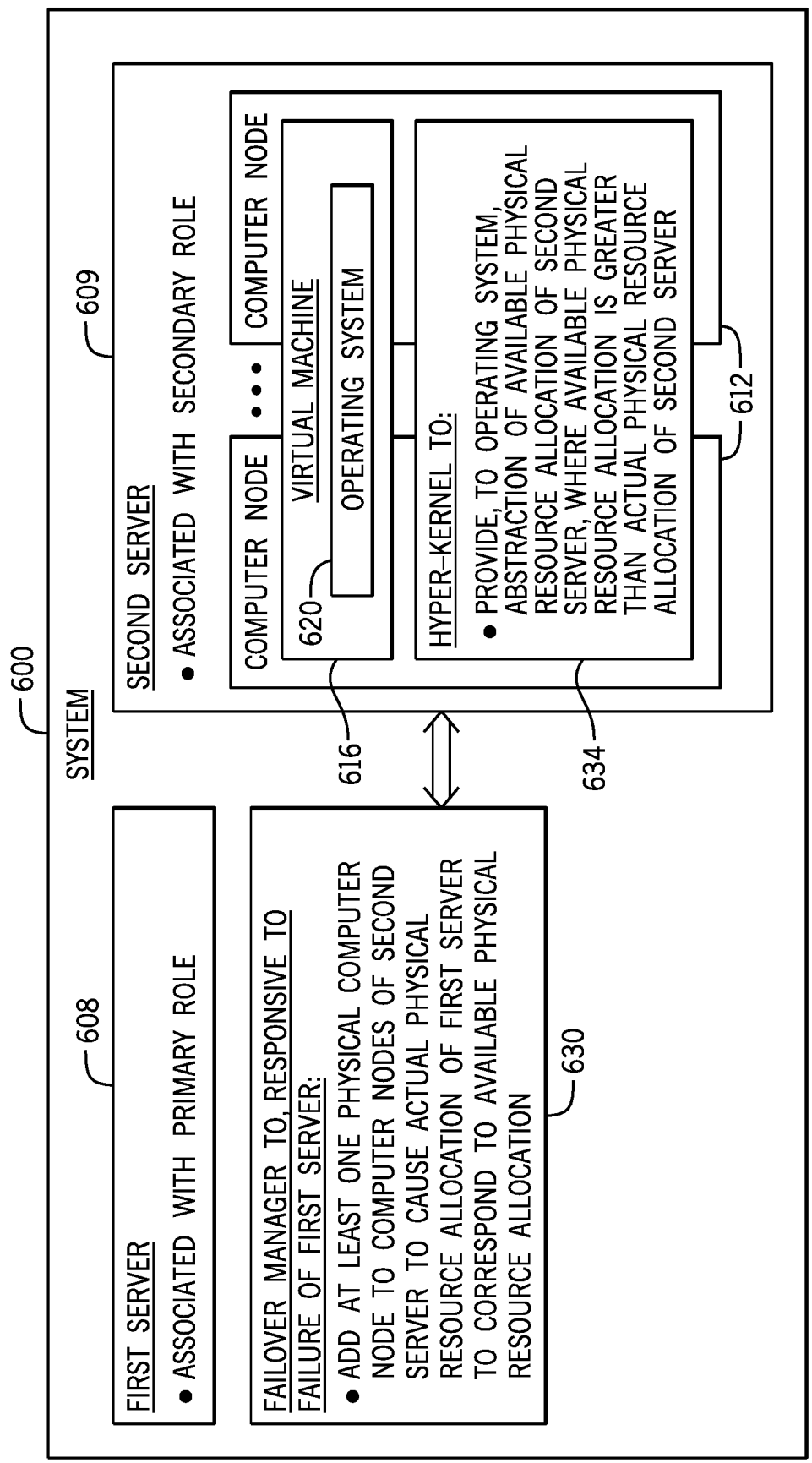
FIG. 6 is a block diagram of a system having a failover manager to, responsive to a failure of a first server and without causing a second server to reboot, add at least one physical node to the second server to prepare the second server to takeover for the first server according to an example implementation.

Referring to FIG. 6, in accordance with example implementations, a system 600 includes a pair of servers including a first server 608 and a second server 609. The first server 608 is associated with a primary role of the pair, and the second server 609 is associated with a secondary role of the pair. In accordance with example implementations, the secondary server may be a thinly-provisioned SDS. In accordance with some implementations, the first server 608 may be an SDS. In accordance with some implementations, the pair of servers may be part of an HA system. In accordance with some implementations, the pair of servers may be part of a DR system. In accordance with some implementations, the first server 608 may provide application services and database management for a database management system (DBMS). In accordance with some implementations, the second server 609 may be sized to maintain a database state that is current with a database state of the first server 608.

The system 600 includes a virtual machine 616; computer nodes 612; an operating system 620; and a hyper-kernel 634. In accordance with some implementations, the operating system 620 may be a guest operating system of the virtual machine 616. The computer nodes 612 host the virtual machine 616 and correspond to an actual physical resource allocation of the second server 609.

The hyper-kernel 634 provides, to the operating system, an abstraction of an available physical resource allocation of the second server 609. The available physical resource allocation is greater than the actual physical resource allocation of the first server 608. In accordance with some implementations, the hyper-kernel 634 may be a hypervisor. In accordance with some implementations, the hyper-kernel 634 may use resource mapping for purposes of providing the abstraction. The resource mapping may provide, in accordance with example implementations, a physical resource map, an initial virtual resource map and a current resource map. The physical resource map is a table that describes the physical resources that are available to each node 612. The initial virtual resource map may be fixed prior to booting of the operating system 620 and describes the virtual resources that are available from the point of view of the operating system 620. The current resource map may be created and maintained by the hyper-kernel 634. The current resource map may describe the current mapping between the virtual resource map and the physical resource map from the point of view of each computer node 612. In accordance with some implementations, the computer nodes 612 may be blade servers or rack servers.

The system 600 includes a failover manager 630. The failover manager 630, responsive to a failure of the first server 608 and without disrupting the operating system 620, adds at least one physical computer node to the computer nodes 612 to cause the actual physical resource allocation to correspond to the available physical resource allocation. In accordance with some implementations, the adding of the physical computer node(s) corresponds to thickening of a thinly-provisioned second server 609. In accordance with some implementations, the failover manager 630 may add the physical computer node(s) by changing or updating a resource mapping of the second server 609. In accordance with some implementations, the added physical computer node(s) may correspond to one or multiple computer nodes that are added from a spare pool of computer nodes. The computer nodes of the spare pool may be fully booted and fully powered-up before being added to the computer nodes 612. In accordance with some implementations, the second server 609 may include at least one additional virtual machine 616 hosted by, or running across, the computer nodes 612.

Figure 7:
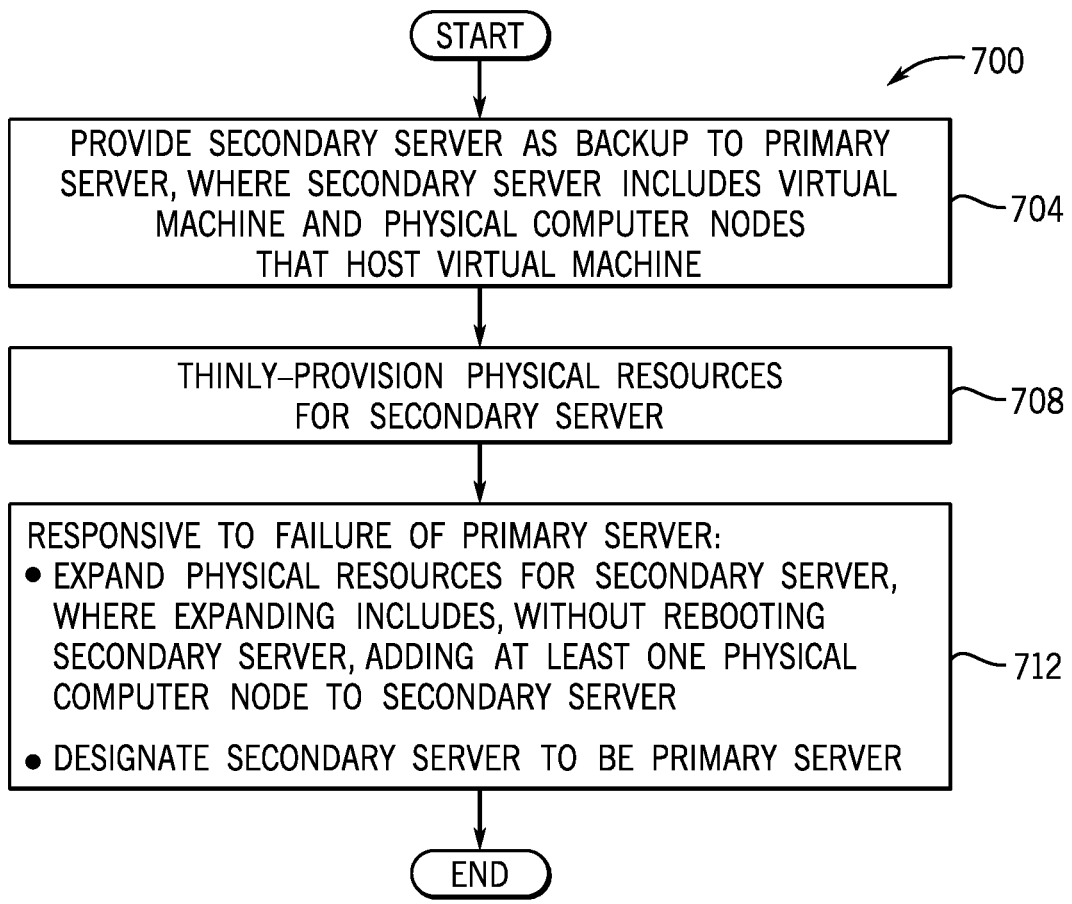
FIG. 7 is a flow diagram depicting a technique to, responsive to a failure of a primary server and without causing a secondary server to reboot, prepare the secondary server to takeover for the primary server according to an example implementation.

Referring to FIG. 7, in accordance with example implementations, a technique 700 includes providing (block 704) a secondary server as a backup to a primary server. The secondary server includes a virtual machine and computer nodes hosting the virtual machine.

In accordance with some implementations, the secondary server may be an SDS. In accordance with some implementations, the secondary server may be a thinly-provisioned SDS. In accordance with some implementations, the primary server may be an SDS. In accordance with some implementations, the primary server and the secondary server may be an HA server pair and may be disposed in different respective availability zones or regions. In accordance with some implementations, the primary server and the secondary server may be part of a DR system.

The technique 700 includes thinly-provisioning (block 708) physical resources for the secondary server. In accordance with example implementations, thinly-provisioning the secondary server includes oversubscribing physical resources of the secondary server. In accordance with some implementations, the thin-provisioning of the secondary server includes sizing the secondary server to allow the secondary server to maintain a database state that is consistent with the primary server while keeping the size below what is required to provide the application services that are provided by the primary server.

The technique 700 incudes, pursuant to block 712, responsive to the failure of the primary server, expanding the physical resources for the secondary server, where the expansion includes, without rebooting the secondary server, adding at least one physical computer node to the secondary server; and designating the secondary server to be the primary server. In accordance with some implementations, the expansion of the physical resources includes updating resource mapping information of an SDS to include physical resources of one or multiple computer nodes previously designated as being spares.

In accordance with example implementations, the primary server may include a second virtual machine that is hosted by a primary set of physical computer nodes. The number of the secondary set of physical computer nodes of the secondary computer system in the secondary role is less than the number of the primary set of physical computers of the primary computer system in the primary role. The number of the secondary set of physical computer nodes of the secondary computer system in the secondary role corresponds to the second physical resource allocation. Among the potential advantages, costs associated with providing and maintaining a secondary server may be reduced while still providing a seamless transition in the event of a primary server failure.

In accordance with example implementations, in the preparation of the second server, the number of the nodes added may be the same or greater than the number of nodes of the primary server. Among the potential advantages, costs associated with providing and maintaining a secondary server may be reduced while still providing a seamless transition in the event of a primary server failure.

In accordance with some implementations, the second server may be a software-defined server. The preparation of the secondary server may include updating a resource mapping of the software-defined server. Among the potential advantages, costs associated with providing and maintaining a secondary server may be reduced while still providing a seamless transition in the event of a primary server failure.

In accordance with example implementations, updating the resource mapping includes updating a physical resource map of the software-defined server to include physical resources of the computer node(s) being added. Among the potential advantages, costs associated with providing and maintaining a secondary server may be reduced while still providing a seamless transition in the event of a primary server failure.

In accordance with some implementations, updating the resource mapping includes updating a mapping between a virtual resource map of the software-defined server and a physical resource map of the software-defined server. The virtual resource map describes virtual resources of the software-defined server from a point of view of a guest operating system of the software-defined server. Among the potential advantages, costs associated with providing and maintaining a secondary server may be reduced while still providing a seamless transition in the event of a primary server failure.

In accordance with example implementations, the preparation of the secondary server occurs without interrupting an operating system of the secondary server. Among the potential advantages, costs associated with providing and maintaining a secondary server may be reduced while still providing a seamless transition in the event of a primary server failure.

In accordance with example implementations, the preparation of the secondary server occurs without interrupting an application of the secondary server. Among the potential advantages, costs associated with providing and maintaining a secondary server may be reduced while still providing a seamless transition in the event of a primary server failure.

In accordance with example implementations, the primary server and the secondary server are at least one of a pair of high availability (HA) servers or a pair of disaster recovery (DR) servers. Among the potential advantages, costs associated with providing and maintaining a secondary server may be reduced while still providing a seamless transition in the event of a primary server failure.

While the present disclosure has been described with respect to a limited number of embodiments, those skilled in the art, having the benefit of this disclosure, will appreciate numerous modifications and variations therefrom. It is intended that the appended claims cover all such modifications and variations.

What is claimed is:

1. A non-transitory computer-readable storage medium to store instructions, that, when executed by a machine, cause the machine to:
    associate a secondary computer system with a primary computer system, wherein the secondary computer system comprises a first virtual machine hosted by a secondary set of physical computer nodes, the primary computer system having a primary role, the primary role corresponding to a minimum physical resource allocation, the secondary computer system being associated with a secondary role, and the secondary computer system being provisioned with a second physical resource allocation less than the minimum physical resource allocation; and
    responsive to the primary computer system failing and without rebooting the secondary computer system:
        prepare the secondary computer system to take over the primary role, wherein the preparation comprises adding at least one physical computer node to the secondary set of physical computer nodes to cause the second physical resource allocation to meet or exceed the minimum physical resource allocation; and
        cause the secondary computer system to take over the primary role.

2. The non-transitory computer-readable storage medium of claim 1, wherein:
    the primary computer system, in the primary role, comprises a second virtual machine hosted by a primary set of physical computer nodes;
    a number of the secondary set of physical computer nodes of the secondary computer system in the secondary role is less than the number of the primary set of physical computer nodes of the primary computer system in the primary role; and
    the number of the secondary set of physical computer nodes of the secondary computer system in the secondary role corresponds to the second physical resource allocation.

3. The non-transitory computer-readable storage medium of claim 2, wherein the instructions, when executed by the machine, further cause the machine to, in the preparation of a second computer system, add the at least one physical computer node to the secondary set of physical computer nodes to cause the number of the secondary set of physical computer nodes to be the same or greater than the number of the primary set of physical computer nodes of the primary computer system in the primary role.

4. The non-transitory computer-readable storage medium of claim 1, wherein:
    a second computer system comprises a software-defined server; and
    the instructions, when executed by the machine, further cause the machine to, in the preparation of the second computer system, update a resource mapping of the software-defined server.

5. The non-transitory computer-readable storage medium of claim 4, wherein updating the resource mapping comprises updating a physical resource map of the software-defined server to include physical resources of the at least one physical computer node.

6. The non-transitory computer-readable storage medium of claim 4, wherein updating the resource mapping comprises updating a mapping between a virtual resource map of the software-defined server and a physical resource map of the software-defined server, wherein the virtual resource map describes virtual resources of the software-defined server from a point of view of a guest operating system of the software-defined server.

7. The non-transitory computer-readable storage medium of claim 1, wherein the preparation of the secondary computer system occurs without interrupting an operating system of the secondary computer system.

8. The non-transitory computer-readable storage medium of claim 1, wherein the preparation of the secondary computer system occurs without interrupting an application of the secondary computer system.

9. The non-transitory computer-readable storage medium of claim 1, wherein the primary computer system and the secondary computer system comprise at least one of a pair of high availability servers or a pair of disaster recovery servers.

10. A system comprising:
    a pair of servers comprising a first server associated with a primary role of the pair and a second server associated with a secondary role of the pair, wherein the second server comprises:
        a virtual machine;
        a first plurality of physical computer nodes hosting the virtual machine and corresponding to an actual physical resource allocation of the second server;
        an operating system; and
        a hyper-kernel to provide, to the operating system, an abstraction of an available physical resource allocation of the second server, wherein the available physical resource allocation is greater than the actual physical resource allocation; and
    a failover manager to, responsive to a failure of the first server and without disrupting the operating system, add at least one physical computer node to the first plurality of physical computer nodes to cause the actual physical resource allocation to correspond to the available physical resource allocation.

11. The system of claim 10, wherein:
    the second server comprises a software-defined server of a plurality of software-defined servers; and
    the at least one physical computer node, before being added, corresponds to at least one spare computer node of a pool of spare computer nodes available to the plurality of software-defined servers for upscaling.

12. The system of claim 10, wherein:
    the first server comprises a software-defined server; and
    the second server comprises a software-defined server.

13. The system of claim 10, wherein:
    the first server to, prior to the failure, provide an application service and maintain a first database state, and the first server having an actual physical resource allocation sized to provide the application service and maintain the first database state; and
    the actual physical resource allocation corresponding to the first plurality of computer nodes is sized to maintain a second data state consistent with the first database state but not sized to provide the application service.

14. The system of claim 10, wherein the actual physical resource allocation corresponding to the available physical resource allocation comprises the actual physical resource allocation being greater than or equal to the available physical resource allocation.

15. The system of claim 10, wherein:
    the hyper-kernel uses resource mapping information to map between a virtual resource map and a physical resource map;

the virtual resource map describes virtual resources visible to the operating system; and the failover manager to further update the physical resource map to include physical resources of the at least one physical computer node.

16. The system of claim 10, wherein the failover manager to further update mapping information of the second server to map virtual resources visible by the operating system to physical resources of the at least one additional physical computer node.

17. A method comprising:

providing a secondary server as a backup to a primary server, wherein the secondary server comprises a virtual machine and a plurality of physical computer nodes hosting the virtual machine;

thinly provisioning physical resources for the secondary server; and responsive to a failure of the primary server:

expanding the physical resources for the secondary server, wherein the expanding comprises, without rebooting the secondary server, adding at least one physical computer node to the secondary server; and designating the secondary server to be the primary server.

18. The method of claim 17, wherein:

thinly provisioning the physical resources for the secondary server comprises causing a hyper-kernel of the secondary server to provide a perceived physical resource allocation for the secondary server that is greater than an actual physical resource allocation for the secondary server; and expanding the physical resources comprises causing the perceived physical resource allocation to be commensurate with the actual physical resource allocation.

19. The method of claim 17, wherein:

the secondary server comprises a software-defined server of a plurality of software-defined servers located in a data center; and the at least one physical computer node corresponds to a spare computer node of a pool of spare computer nodes of the data center available to the plurality of software-defined servers.

20. The method of claim 17, wherein the primary server comprises a software-defined server, and the secondary server comprises a software-defined server.

* * * * *